(12) United States Patent
Rao et al.

(10) Patent No.: US 12,190,640 B2
(45) Date of Patent: Jan. 7, 2025

(54) PERSONALIZED FITNESS ACTIVITY TRAINING USING AUGMENTED-REALITY BASED AVATAR

(71) Applicant: SONY GROUP CORPORATION, Tokyo (JP)

(72) Inventors: Mahima Rao, Bangalore (IN); Teli Pooja, Bangalore (IN); Sankaran Kesavan Namboodiri, Bangalore (IN); Anubhav Srivastava, Bangalore (IN)

(73) Assignee: SONY GROUP CORPORATION, Tokyo (JP)

( * ) Notice: Subject to any disclaimer, the term of this patent is extended or adjusted under 35 U.S.C. 154(b) by 624 days.

(21) Appl. No.: 17/459,306

(22) Filed: Aug. 27, 2021

(65) Prior Publication Data
US 2023/0069758 A1 Mar. 2, 2023

(51) Int. Cl.
*G06V 40/20* (2022.01)
*A63B 24/00* (2006.01)
(Continued)

(52) U.S. Cl.
CPC .......... *G06V 40/23* (2022.01); *A63B 24/0062* (2013.01); *A63B 24/0075* (2013.01);
(Continued)

(58) Field of Classification Search
CPC .... G06V 40/23; G06V 10/82; A63B 24/0062; A63B 24/0075; A63B 71/0622; A63B 2024/0068; A63B 2071/063; A63B 2220/24; A63B 2230/62; G06F 18/214; G06F 18/2413; G06T 7/251; G06T 13/40; G06T 13/80; G06T 2200/24; G06T 2207/20084; G06T 2207/30196; G06T 2207/20081; G06T 2207/30221;
(Continued)

(56) References Cited

U.S. PATENT DOCUMENTS

2019/0077007 A1* 3/2019 Mallinson ............. A61B 5/1118
2020/0051446 A1* 2/2020 Rubinstein ............. G06N 20/00

FOREIGN PATENT DOCUMENTS

| CN | 111860157 A | 10/2020 |
| CN | 212724074 U | 3/2021 |
| KR | 10-1970687 B1 | 4/2019 |

* cited by examiner

*Primary Examiner* — Said Broome
*Assistant Examiner* — Andrew Shin
(74) *Attorney, Agent, or Firm* — CHIP LAW GROUP

(57) ABSTRACT

An electronic device and method for personalized fitness activity training using augmented-reality based avatar are provided. The electronic device receives a first set of images of a first user. The first set of images is captured for a duration in which the first user is engaged in a first fitness activity. The electronic device generates an augmented-reality display that includes a first avatar and an image of the first user based on the first set of images. The electronic device further controls a display device to render the generated augmented-reality display. The electronic device further determines posture information of the first user based on the first set of images. The electronic device determines real-time feedback based on application of a first neural network model on the determined posture information. The electronic device controls the first avatar to output the determined real-time feedback in the augmented-reality display.

19 Claims, 8 Drawing Sheets

(51) Int. Cl.
    *A63B 71/06*         (2006.01)
    *G06F 18/214*       (2023.01)
    *G06F 18/2413*     (2023.01)
    *G06T 7/246*        (2017.01)
    *G06T 13/40*        (2011.01)
    *G06T 13/80*        (2011.01)

(52) U.S. Cl.
    CPC ........ *A63B 71/0622* (2013.01); *G06F 18/214* (2023.01); *G06F 18/2413* (2023.01); *G06T 7/251* (2017.01); *G06T 13/40* (2013.01); *G06T 13/80* (2013.01); *A63B 2024/0068* (2013.01); *A63B 2071/063* (2013.01); *A63B 2220/24* (2013.01); *A63B 2230/62* (2013.01); *G06T 2200/24* (2013.01); *G06T 2207/20084* (2013.01); *G06T 2207/30196* (2013.01)

(58) Field of Classification Search
    CPC .... A63F 13/213; A63F 13/428; A63F 13/537; A63F 13/816
    See application file for complete search history.

PERSONALIZED FITNESS ACTIVITY TRAINING USING AUGMENTED-REALITY BASED AVATAR

CROSS-REFERENCE TO RELATED APPLICATIONS/INCORPORATION BY REFERENCE

None.

FIELD

Various embodiments of the disclosure relate to fitness activity training. More specifically, various embodiments of the disclosure relate to an electronic device and method for personalized fitness activity training using augmented-reality based avatar.

BACKGROUND

With the busy schedule of individuals, there are many reasons that may compel an individual to exercise (or workout) at home rather than going to a gymnasium. Some of the benefits associated with exercising at home rather than the gymnasium includes eliminating the need to drive to the gymnasium, eliminating the need to comply with a set schedule (set by the gymnasium), eliminating membership fee and other costs (such as travel costs), all within the comfort and safety of home. Existing fitness applications that exist in the market do not offer any interactivity or assessment, but include pre-loaded training videos related to different types of exercises. Typically, the individual may view the training videos, and may imitate the trainer in these videos. However, due to lack of interactivity from such training videos, the individual may not receive personalized and real-time feedback and/or recommendations for improvement. Moreover, acquiring the services of a personalized online trainer may be not only expensive but also inaccessible due to lack of trainers.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and a method for personalized fitness activity training using augmented-reality based avatar is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
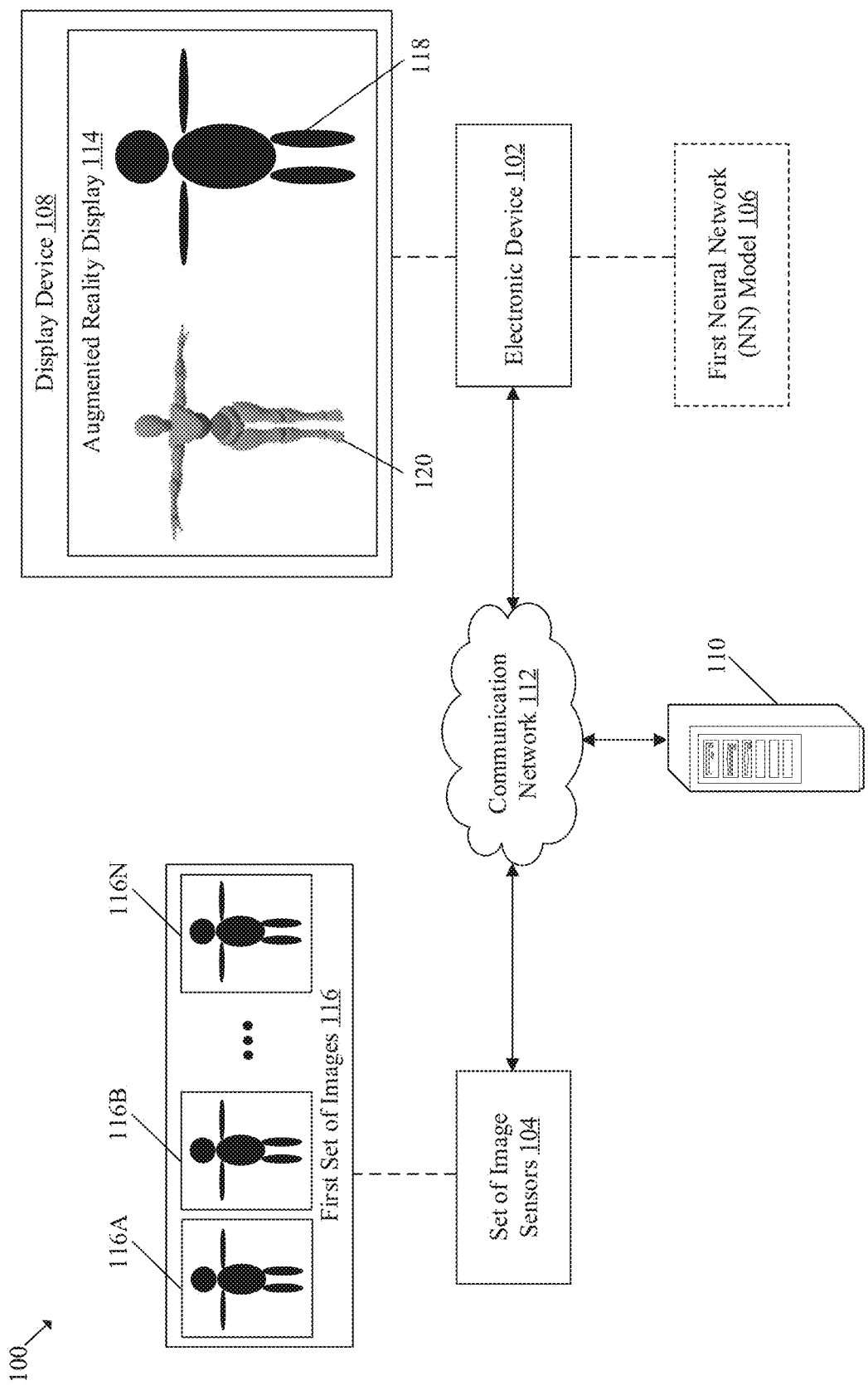
FIG. 1 is a block diagram that illustrates an exemplary network environment for personalized fitness activity training using augmented-reality based avatar, in accordance with an embodiment of the disclosure.

The following described implementations may be found in the disclosed electronic device and method for personalized fitness activity training using augmented-reality based avatar. The electronic device and method may render an augmented reality-based avatar that may provide personalized assistance to the user to achieve a fitness goal of the user. Exemplary aspects of the disclosure provide an electronic device (for example, a smart television, a laptop, or a mobile phone) that may be configured to receive a set of images of a user. The set of images may be captured for a duration in which the user is engaged in a fitness activity (such as aerobic, strength training, or Yoga). The electronic device may generate an augmented-reality display that includes an avatar and an image (for example, a live image) of the user based on the set of images. The electronic device may control a display device to render the generated augmented-reality display. The rendered augmented-reality display may include the avatar configured to perform the fitness activity. The electronic device may determine posture information of the user based on the set of images for the duration in which the user may be engaged in the fitness activity. The electronic device may determine a real-time feedback based on an application of a neural network model on the determined posture information. The determination of the real-time feedback may be in response to performance of the fitness activity by the user. The electronic device may control the avatar to output the determined real-time feedback in the augmented-reality display. The electronic device may thereby provide real-time and personalized feedback in the augmented-reality display based on assessment of posture of the user by the neural network model. The avatar-based personalized assistance may be accessible any time of the day, while the augmented-reality display may simulate a personalized trainer experience in a real gymnasium environment. The electronic device may provide an interactive experience for the user during the fitness activity based on real-time feedback of the first avatar in an augmented-reality environment.

The electronic device may utilize the neural network model and augmented reality to provide personalized real-time feedback including improvement suggestions to the user. In an embodiment, the electronic device may output the real-time feedback as one of a movement of the first avatar in the augmented-reality display, a synthesized speech, or a textual feedback. For example, in a case where the posture information indicates that the user is performing the fitness activity in a wrong manner (for example, by employing a wrong posture), the electronic device may control the first avatar to pause the fitness activity and demonstrate the correct posture for the fitness activity. In another example, in a case where the number of repetitions of the fitness activity by the user is less than a threshold, the electronic device may control the first avatar to output a motivational phrase to motivate the user to finish the repetitions. In an embodiment, the real-time feedback may be associated with at least one of a movement of one or more parts of a body of the user, a posture of the user, the number of repetitions of the first fitness activity, the duration of the first fitness activity, or a breathing pattern of the user during the first fitness activity.

In an embodiment, the electronic device may be configured to receive a user input associated with at least one of a set of body parameters of the user, a user profile of the user, a fitness goal of the user, a medical condition of the user, or an experience level of the user in performing the first fitness activity. The electronic device may further acquire a performance history of the user associated with one or more previous fitness activities of the user. The electronic device may generate a fitness routine that includes a suggestion of one or more potential fitness activities based on at least one of the received user input or the performance history. The electronic device may output the fitness routine on one of the display device or a user device associated with the user.

The electronic device may further determine, based on the fitness routine, a diet chart and an activity schedule for performing the first fitness activity by the user. The electronic device may further output one or more notifications periodically to the user device based on the determined diet chart and the activity schedule. The notifications may include one of a reminder to perform the first fitness activity, a reminder for consuming proper diet at proper intervals, or a status of the first fitness activity with respect to the fitness goal. The electronic device may periodically update the personalized fitness routine and activity schedule, which may provide insights about the progress with respect to the fitness goal, improvement areas to achieve the fitness goal, and so forth. The electronic device may thereby simulate a personalized trainer experience based on the personalized fitness routine, the personalized activity schedule, and the periodic notifications.

FIG. 1 is a block diagram that illustrates an exemplary network environment for personalized fitness activity training using augmented-reality based avatar, in accordance with an embodiment of the disclosure. With reference to FIG. 1, there is shown a network environment 100. The network environment 100 may include an electronic device 102, a set of image sensors 104, a first neural network (NN) model 106, a display device 108, a server 110, and a communication network 112. The electronic device 102 may be communicatively coupled to the set of image sensors 104, the first NN model 106, the display device 108, and the server 110, via the communication network 112.

In FIG. 1, the first NN model 106 is shown as being separate from the electronic device 102. However, the disclosure may not be so limiting and in some embodiments, the first NN model 106 may be included in the electronic device 102, without departing from scope of the disclosure. With reference to FIG. 1, there is further shown an augmented-reality display 114, a first set of images 116 of a first user 118, and a first avatar 120. The first set of images 116 may include a first image 116A, a second image 116B up to an Nth image 116N.

The electronic device 102 may include suitable logic, circuitry, interfaces, and/or code that may be configured to receive the set of images 116 from the set of image sensors 104, generate the augmented-reality display 114 including the first avatar 120, determine posture information of the first user 118 from the set of images 116, apply the first NN model 106 on the posture information, and control the first avatar 120 to provide real-time feedback to the first user 118 in the augmented-reality display 114. The electronic device 102 may download an application related to the personalized fitness activity training from an application store/marketplace. The electronic device 102 may execute the application to display a graphical user interface for the selection of the first fitness activity from a plurality of fitness activities, the generation of the augmented-reality display 114, and the application of the first NN model 106 to provide the real-time feedback. Examples of the electronic device 102 may include, but are not limited to, a head-mounted display, an eXtended Reality (XR) device, a wearable electronic device (such as smart glasses), a computing device, a personal computer, a computer workstation, a mainframe computer, a handheld computer, a smartphone, a cellular phone, a gaming console, a server, a smart television, and/or other computing devices with information processing and image processing capabilities.

Each of the set of image sensors 104 may include suitable logic, circuitry, and/or interfaces that may be configured to capture the first set of images 116 (for example, a video) of the first user 118. In some embodiments, the set of image sensors 104 may be configured to capture a second set of images of a set of users including the first user 118 and a second user. The set of image sensors 104 may be configured to transmit the captured first set of images 116 or the second set of images to the electronic device 102 in real time. The set of image sensors 104 may include a single image sensor or multiple image sensors configured to capture the first set of images 116 of the first user 118 from one or more viewpoints. Examples of each of the set of image sensors 104 may include, but are not limited to, a depth camera, a wide-angle camera, an action camera, a closed-circuit television (CCTV) camera, a camcorder, a digital camera, camera phones, a time-of-flight camera (ToF camera), a night-vision camera, and/or other image capture devices. In FIG. 1, the set of image sensors 104 is shown as being separate from the electronic device 102. However, the disclosure may not be so limiting and in some embodiments, the set of image sensors 104 may be integrated with the electronic device 102, without departing from scope of the disclosure.

The first neural network (NN) model 106 may be a model that may be trained to accept a first set of key points associated with the first user 118 and to output various results in the form of a classification result associated with a posture of the first user 118. In another embodiment, the first NN model 106 may be configured to output various results in the form of recommendation results, clustering results, regression or prediction results, and/or a combination thereof.

The first NN model 106 (such as a convolutional neural network) may be a machine learning model, and may be defined by its hyper-parameters, for example, activation function(s), number of weights, cost function, regularization function, input size, number of layers, and the like. In an embodiment, the first NN model 106 may be a computational network or a system of artificial neurons or as nodes, arranged in a plurality of layers. The plurality of layers of the first NN model 106 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the first NN model 106. Outputs of each hidden layer may be coupled to inputs of at least one node in other layers of the first NN model 106. Node(s) in the final layer may receive inputs from at least one hidden layer to output a result. The number of layers and the number of nodes in each layer may be determined from hyper-parameters of the first NN model 106. Such hyper-parameters may be set before training, while training, or after training the first NN model 106 on a training dataset.

Each node of the first NN model 106 may correspond to a mathematical function (e.g., a sigmoid function or a rectified linear unit) with a set of parameters, tunable during training of the first NN model 106. The set of parameters may include, for example, a weight parameter, a regularization parameter, and the like. Each node may use the mathematical function to compute an output based on one or more inputs from nodes in other layer(s) (e.g., previous layer(s)) of the first NN model 106. All or some of the nodes of the first NN model 106 may correspond to the same or a different mathematical function.

In accordance with an embodiment, the electronic device 102 may train the first NN model 106 on one or more features related to the set of images 116, one or more features related to the posture information of the first user 118, and so on, to obtain the trained first NN model 106. The first NN model 106 may be trained to classify the posture information of the first user 118 into good posture or bad posture, and to generate real-time feedback based on the performance of the fitness activity by the first user 118. For example, the electronic device 102 may input the set of images 116 of the first user 118, a profile of the first user 118, sensor data associated with biological information of the first user 118, a set of key points associated with the posture information for each fitness activity, a movement of one or more body parts for each fitness activity, a number of repetitions for each fitness activity, the duration of each fitness activity, a breathing pattern associated with each fitness activity, and so on, to train the first NN model 106.

In training of the first NN model 106, one or more parameters of each node of the first NN model 106 may be updated based on whether an output of the final layer for a given input (from the training dataset) matches a correct result based on a loss function for the first NN model 106. The above process may be repeated for the same or a different input until a minima of loss function is achieved, and a training error is minimized. Several methods for training are known in art, for example, gradient descent, stochastic gradient descent, batch gradient descent, gradient boost, meta-heuristics, and the like.

The first NN model 106 may include electronic data, which may be implemented as, for example, a software component of an application executable on the electronic device 102. The first NN model 106 may rely on libraries, external scripts, or other logic/instructions for execution by a processing device, such as electronic device 102. The first NN model 106 may include code and routines configured to enable a computing device, such as the electronic device 102 to perform one or more operations for classification of the posture information of the first user 118 and generation of the real-time feedback. Additionally, or alternatively, the first NN model 106 may be implemented using hardware including, but not limited to, a processor, a microprocessor (e.g., to perform or control performance of one or more operations), a field-programmable gate array (FPGA), a co-processor, or an application-specific integrated circuit (ASIC). Alternatively, in some embodiments, the first NN model 106 may be implemented using a combination of hardware and software.

Examples of the first NN model 106 may include, but are not limited to, a Bayesian model, a decision tree, a Support Vector Machine, a deep neural network (DNN), a convolutional neural network (CNN), a recurrent neural network (RNN), an artificial neural network (ANN), a gated recurrent unit (GRU)-based RNN, a fully connected neural network, a deep Bayesian neural network, a hybrid DNN, and/or a combination of such networks.

The display device 108 may include suitable logic, circuitry, and interfaces that may be configured to render the augmented-reality display 114. In an embodiment, the augmented-reality display 114 on the display device 108 may include the first avatar 120 and an image (for example, a live image) of the first user 118. In an embodiment, the electronic device 102 may determine a first position of the first user 118 in the augmented-reality display 114 based on the first set of images 116. The electronic device 102 may control the display device 108 to render the first avatar 120 at a second position in the augmented-reality display 114 based on the determined first position. The electronic device 102 may control the display device 108 to display the augmented-reality display 114 so as to seamlessly blend the virtual world (for example the first avatar 120 and its animations) and the real world (for example, the first user 118 and background of the first user 118). The display device 108 may be a touch screen which may enable a user to provide a user-input via the display device 108. The touch screen may be at least one of a resistive touch screen, a capacitive touch screen, or a thermal touch screen. The display device 108 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 108 may refer to a display screen of a head mounted device (HMD), a smart-glass device, a see-through display, a projection-based display, an electro-chromic display, or a transparent display. In FIG. 1, the display device 108 is shown as being separate from the electronic device 102. However, the disclosure may not be so limiting and in some embodiments, the display device 108 may be integrated with the electronic device 102, without departing from scope of the disclosure.

The server 110 may include suitable logic, circuitry, interfaces, and/or code that may be configured to store user-specific data, such as but not limited to, a user profile of the first user 118, a set of body parameters of the first user 118, a fitness goal of the first user 118, a medical condition of the first user 118, an experience level of the first user 118, a performance history associated with one or more previous fitness activities of the first user 118, a progress of the first user 118 with respect to the fitness goal, the fitness routine of the first user 118, the activity schedule of the first user 118, the diet plan of the first user 118, and so on. In some embodiments, the server 110 may store metadata for generation of a plurality of avatars including the first avatar 120, metadata (such as number of repetitions per level, variations, tempo) associated with a plurality of fitness activities, posture information (such as good and bad postures) associated with each fitness activity, a plurality of animations of the first avatar 120 corresponding to each fitness activity, a plurality of animations corresponding to output of the real-time feedback by the first avatar 120 on the display device 108, and so on. In another embodiment, the server 110 may be configured to train the first NN model 106 and a second NN model (shown in FIG. 2), and transmit the trained first NN model 106 and the trained second NN model to the electronic device 102. The second NN model (for example, OpenPose model) may be trained for determination of the posture information of the first user 118 based on the first set of images 116, and for outputting a plurality of key points corresponding to joints of a body of the first user 118. The server 110 may be configured to store the training dataset for training the first NN model 106 and the second NN model, and may update the training data set periodically.

In an embodiment, the server 110 may be implemented as a cloud server which may execute operations through web applications, cloud applications, HTTP requests, repository operations, file transfer, and the like. Other examples of the server 110 may include, but are not limited to a database server, a file server, a web server, a media server, an application server, a mainframe server, a cloud server, or other types of servers. In one or more embodiments, the server 110 may be implemented as a plurality of distributed cloud-based resources utilizing several technologies that are well known to those skilled in the art. A person of ordinary skill in the art will understand that the scope of the disclosure may not be limited to implementation of the server 110 and the electronic device 102 as separate entities. In certain embodiments, the functionalities of the server 110 may be incorporated in its entirety or at least partially in the electronic device 102, without departing from the scope of the disclosure.

The communication network 112 may include a communication medium through which the electronic device 102, the first NN model 106, and the server 110 may communicate with each other. The communication network 112 may be a wired or wireless communication network. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the electronic device 102 may receive a user input for selection of the first fitness activity from a set of fitness activities. The user input may indicate that the first user 118 may be ready to perform the first fitness activity. The first fitness activity may correspond to an exercise/workout to improve fitness and wellbeing of the first user 118. For example, the first fitness activity may correspond to an exercise related to a specific part of a body of the first user 118. For example, the exercises related to the chest of the first user 118 may include, but are not limited to, bench press, dumbbell press, dumbbell pullover, dumbbell fly, decline press, incline dumbbell fly, incline press, incline dumbbell fly, and the like. Similarly, the exercises related to triceps of the first user 118 may include, but are not limited to, triceps pushdown, seated barbell extension, overhead triceps extension, overhead barbell extension, one-arm dumbbell extension, seated dumbbell extension, dumbbell kickback, dumbbell triceps extension, and the like. In some embodiments, the first fitness activity may include aerobic exercises, Yoga, dance forms, running, gymnastics, and the like.

Based on the reception of the user input, the electronic device 102 may be configured to control the set of image sensors 104 to capture the first set of images 116 of the first user 118. The first set of images 116 may be captured for a duration in which the first user 118 may be engaged in the first fitness activity. The electronic device 102 may be further configured to generate the augmented-reality display 114 that may include the first avatar 120 and an image (for example, a live image) of the first user 118 based on the first set of images 116. In an embodiment, the electronic device 102 may determine a first position of the first user 118 in the augmented-reality display 114 based on the captured first set of images 116. The electronic device 102 control the display device 108 to render the first avatar 120 in the augmented-reality display 114 at a second position based on the determined first position. For example, the second position of the first avatar 120 in the augmented-reality display 114 may be adjacent to and spaced apart from the first position of the first user 118, as shown in FIG. 1. The position of the first avatar 120 may not be limited to that shown in FIG. 1, and may include other positions so long as the first avatar 120 is clearly distinguishable from the image of the first user 118 in the augmented-reality display 114. The electronic device 102 may be further configured to control the display device 108 to render the generated augmented-reality display 114.

The electronic device 102 may then control the first avatar 120 to begin demonstration of the selected first activity on the display device 108. In an embodiment, the electronic device 102 may detect a specific gesture of the first user 118 based on the first set of images 116 to trigger the first avatar 120 to start the first fitness activity. For example, the electronic device 102 may detect a finger snapping gesture or a finger rolling gesture to trigger the first avatar 120 to start the first fitness activity. In another embodiment, the electronic device 102 may detect a specific input on an interface associated with the electronic device 102 to trigger the first avatar 120 to start the first fitness activity. For example, the specific input may comprise pressing of a specific button on the remote control of a smart television, pressing of a specific button on a handheld controller of a gaming console, or pressing of a specific button on a graphical user interface of a smart phone. The electronic device 102 may detect whether the first user 118 has started to imitate or copy the first avatar 120 to perform the first fitness activity. In a case where the electronic device 102 detects that the first user 118 has not started performing the first fitness activity, the electronic device 102 device may pause the first avatar 120, and verbally or visually prompt the first user 118 to restart the first fitness activity using the specific gesture or the specific input. In a case where the electronic device 102 detects that the first user 118 has started performing the first fitness activity, the electronic device 102 device may control the first avatar 120 to continue the demonstration of the first fitness activity.

The electronic device 102 may be further configured to determine posture information of the first user 118 based on the first set of images 116 for the duration in which the first user 118 is engaged in the first fitness activity. The posture information may include a plurality of key points corresponding to joints and/or parts of a body of the first user 118.

The posture information may indicate a posture of the first user 118 employed during the performance of the first fitness activity. The details about determination of the posture information are provided, for example, in FIGS. 3A and 3B.

Based on the determination of the posture information, the electronic device 102 may be further configured apply the first NN model 106 of a set of neural networks on the determined posture information to determine real-time feedback. The determination of the real-time feedback may be in response to performance of the first fitness activity by the first user 118. The determined real-time feedback may be associated with at least one of a movement of one or more parts of the body of the first user 118, the posture of the first user 118, a number of repetitions of the first fitness activity, the duration of the first fitness activity, a breathing pattern of the first user 118 during the first fitness activity, and so on. In an embodiment, the determined real-time feedback may include one or more improvement suggestions based on the performance of the first user 118. In another embodiment, the determined real-time feedback may include a motivational phrase based on the performance of the first user 118.

The electronic device 102 may further control the first avatar 120 to output the determined real-time feedback in the augmented-reality display 114. For example, the electronic device 102 may be further configured to output the determined real-time feedback as one of a movement of the first avatar 120 in the augmented-reality display 114, a synthesized speech, or a textual feedback. The details of determination and output of the real-time feedback are provided, for example, in FIGS. 3A and 3B. The electronic device 102 may thereby provide real-time and personalized feedback in the augmented-reality display 114 based on assessment of the posture of the first user 118 by the first NN model 106. The electronic device 102 may provide an interactive experience for the first user 118 and may simulate a personalized trainer experience during the first fitness activity based on real-time feedback of the first avatar 120 in an augmented-reality environment.

For example, in a case where the posture information indicates that the first user 118 is performing the first fitness activity in a wrong manner (for example, by employing a wrong posture), the electronic device 102 may control the first avatar 120 to pause the first fitness activity and may demonstrate the correct posture for the fitness activity using other animations (such as other views or closeup views). The electronic device 102 may also output verbal feedback (such as feedback on posture, feedback on tempo, feedback on breathing pattern, and so on). In another example, in a case where the number of repetitions of the first fitness activity by the first user 118 is less than a threshold, the electronic device 102 may control the first avatar 120 to output a motivational phrase to motivate the user to finish the repetitions.

In an embodiment, the electronic device 102 may be configured to receive a user input associated with at least one of a set of body parameters of the first user 118, a user profile of the first user 118, a fitness goal of the first user 118, a medical condition of the first user 118, or an experience level of the first user 118 in performing the first fitness activity. The electronic device 102 may further acquire a performance history of the first user 118 associated with one or more previous fitness activities of the first user 118. The electronic device 102 may generate a fitness routine that includes a suggestion of one or more potential fitness activities based on at least one of the received user input or the performance history. The electronic device 102 may output the fitness routine on one of the display device 108 or a user device (for example, a smart phone) associated with the first user 118.

The electronic device 102 may further determine, based on the fitness routine, a diet chart and an activity schedule for performing the first fitness activity by the first user 118. The electronic device 102 may further output one or more notifications periodically to the user device (for example, the smart phone) based on the determined diet chart and the activity schedule. The notifications may include one of a reminder to perform the first fitness activity, a reminder for consuming proper diet at proper intervals, or a status of the first fitness activity with respect to the fitness goal. The electronic device 102 may periodically update the personalized fitness routine and the activity schedule, which may provide insights about the progress of the first user 118 with respect to the fitness goal, improvement areas to achieve the fitness goal, and so forth. The electronic device 102 may thereby simulate a personalized trainer experience based on the personalized fitness routine, the personalized activity schedule, and the periodic notifications.

Modifications, additions, or omissions may be made to FIG. 1 without departing from the scope of the present disclosure. For example, the network environment 100 may include more or fewer elements than those illustrated and described in the present disclosure. For instance, in some embodiments, the network environment 100 may include the electronic device 102 and an audio rendering device. As another instance, the set of image sensors 104 and the display device 108 are shown as separate from the electronic device 102. However, the disclosure may not be so limiting and in some embodiments, the set of image sensors 104 and the display device 108 may be integrated with the electronic device 102, without departing from scope of the disclosure.

Figure 2:
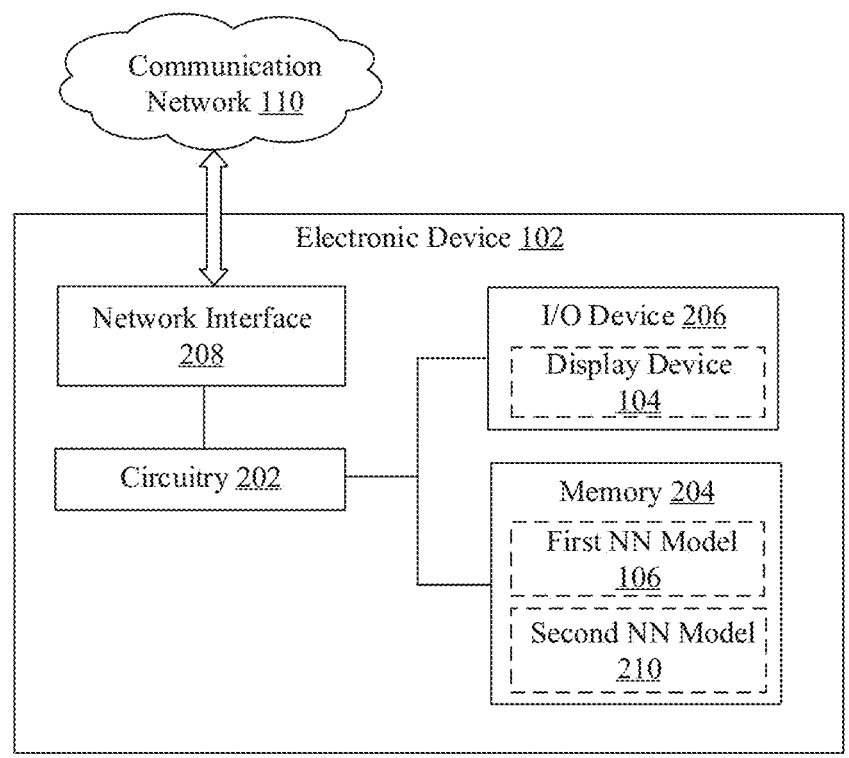
FIG. 2 is a block diagram that illustrates an exemplary electronic device for personalized fitness activity training using augmented-reality based avatar, in accordance with an embodiment of the disclosure.

FIG. 2 is a block diagram that illustrates an exemplary electronic device for personalized fitness activity training using augmented-reality based avatar, in accordance with an embodiment of the disclosure. FIG. 2 is explained in conjunction with elements from FIG. 1. With reference to FIG. 2, there is shown a block diagram 200 of the electronic device 102. The electronic device 102 may include circuitry 202 which may perform operations for personalized fitness activity training using augmented-reality based avatar. The electronic device 102 may further include a memory 204, an input/output (I/O) device 206, and a network interface 208. The memory 204 may include the first NN model 106 and a second neural network (NN) model 210. The circuitry 202 may be communicatively coupled to the memory 204, the I/O device 206, and the network interface 208.

The circuitry 202 may include suitable logic, circuitry, and interfaces that may be configured to execute program instructions associated with different operations to be executed by the electronic device 102. For example, some of the operations may include reception of the first set of images 116, generation of the augmented-reality display 114, control of the display device 108 to display the augmented-reality display 114, determination of the posture information, determination of the real-time feedback, and control of the first avatar 120 to output the determined real-time feedback. The circuitry 202 may include one or more specialized processing units, which may be implemented as a separate processor. In an embodiment, the one or more specialized processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may comprise suitable logic, circuitry, interfaces, and/or code that may be configured to store the instructions to be executed by the circuitry 202. The memory 204 may be configured to store the received first set of images 116, a plurality of key points of a human body, the classification result, an activity schedule for the first user 118, a diet plan for the first user 118, and captured sensor data related to biological information of the first user 118. In some embodiments, the memory 204 may be configured to store user-specific data, such as, a set of body parameters of the first user 118, a user profile of the first user 118, a fitness goal of the first user 118, a medical condition of the first user 118, or an experience level of the first user 118 in performing the first fitness activity. In some embodiments, the memory 204 may download from the server 110 and store metadata for generation of a plurality of avatars including the first avatar 120, metadata (such as number of repetitions per level, variations, tempo) associated with a plurality of fitness activities, posture information (such as good and bad postures) associated with each fitness activity, a plurality of animations of the first avatar 120 corresponding to each fitness activity, a plurality of animations corresponding to output of the real-time feedback by the first avatar 120, and so on. The memory 204 may be further configured to store the first NN model 106 and the second NN model 210, and the training dataset for both the first NN model 106 and the second NN model 210. The memory 204 may be further configured to store several instances of the real-time feedback and the progress of the first user 118 with respect to the fitness goal over a period of time. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, and interfaces that may be configured to receive the user input(s) and provide an output based on the received user input(s). The I/O device 206 may be configured to receive the user input for selection of the first fitness activity or a second fitness activity from a set of fitness activities. The I/O device 206 may be configured to receive the user input associated with at least one of the set of body parameters of the first user 118, the user profile of the first user 118, the fitness goal of the first user 118, the medical condition of the first user 118, or the experience level of the first user 118 in performing the first fitness activity. The I/O device 206 may be configured to receive the user input to trigger the first avatar 120 to start the first fitness activity. The I/O device 206 may be configured to control the first avatar 120 to output the determined real-time feedback in the augmented-reality display 114. The I/O device 206 which may include various input and output devices, which may be configured to communicate with the circuitry 202. Examples of the I/O device 206 may include, but are not limited to, the display device 108, an audio rendering device, a touch screen, a keyboard, a mouse, a handheld controller, a radio wave transceiver, an infrared transceiver, a joystick, and a microphone.

The network interface 208 may include suitable logic, circuitry, and interfaces that may be configured to facilitate communication between the circuitry 202, the set of image sensors 104, the first NN model 106, the display device 108, and the server 110, either directly or via the communication network 112. The network interface 208 may be implemented by use of various known technologies to support wired or wireless communication of the electronic device 102 with the communication network 112. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 208 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The second NN model 210 may be a computational network or a system of artificial neurons, arranged in a plurality of layers, as nodes. Examples of the second NN model 210 may include, but are not limited to, a deep neural network (DNN), a convolutional neural network (CNN), a fully connected neural network, and/or a combination of such networks. The second NN model 210 may be similar in functionality and configuration to the first NN model 106 shown in FIG. 1; however the second NN model 210 may differ from the first NN model 106 in terms of the training dataset used to train the second NN model 210, and the expected output of the second NN model 210. Accordingly, the detailed description of the second NN model 210 is omitted herein, for the sake of brevity. In accordance with an embodiment, the electronic device 102 may train the second NN model 210 on one or more features related to the set of images 116, one or more features related to joints and/or parts of the body of the first user 118, and so on, to obtain the trained second NN model 210. The second NN model 210 may be trained to estimate the posture information of the first user 118, and to generate a plurality of key points corresponding to the parts (such as elbow, wrist, shoulder, neck, head, eyes, hip, knee, ankle, etc.) of the body of the first user 118. The second NN model may correspond to, for example, Open Pose model or any other pose estimation algorithm.

The functions or operations executed by the electronic device 102, as described in FIG. 1, may be performed by the circuitry 202. Operations executed by the circuitry 202 are described in detail, for example, in FIGS. 3-6.

Figure 3A:
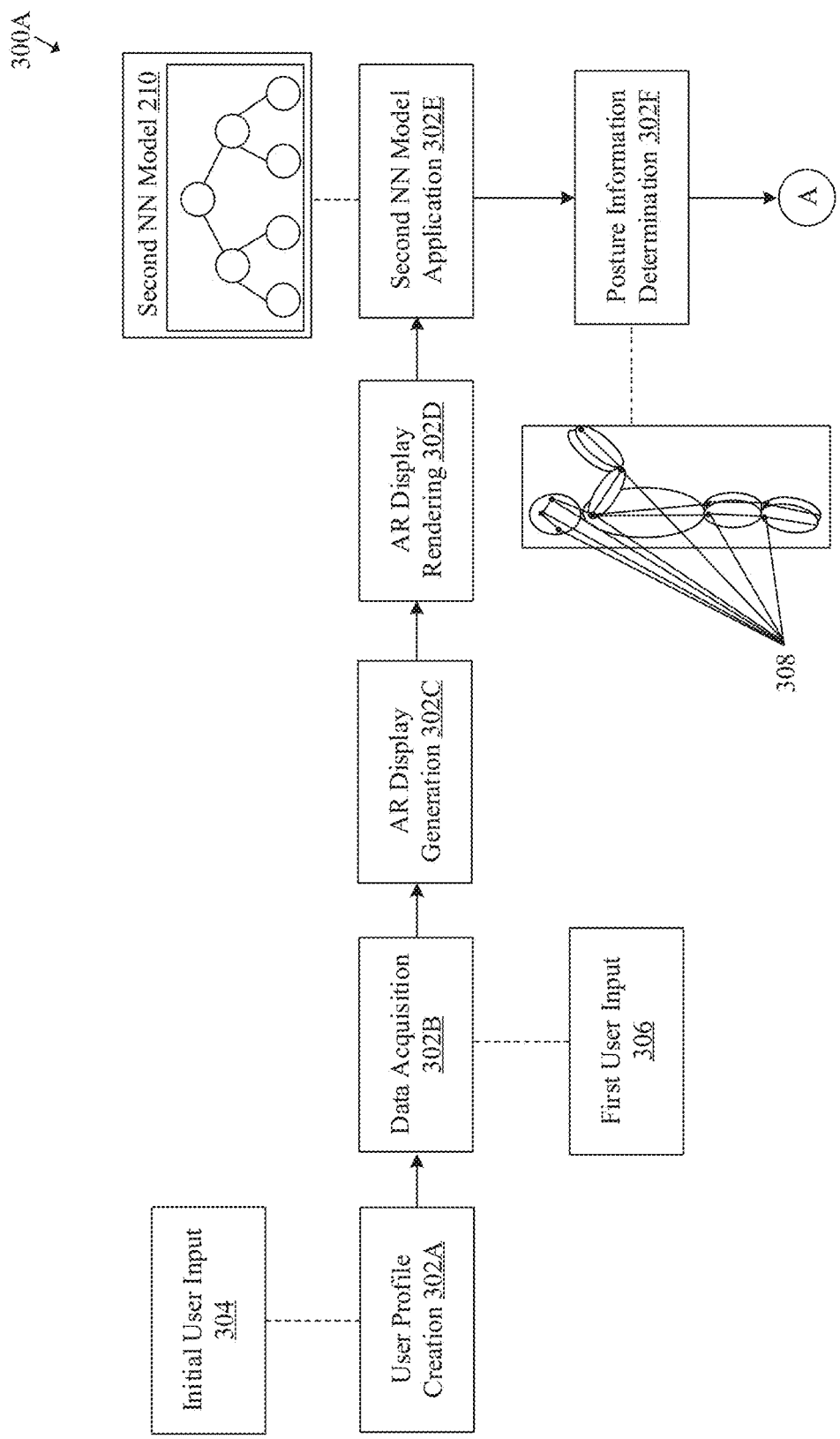
FIGS. 3A-3C collectively illustrates exemplary operations for personalized fitness activity training using augmented-reality based avatar, in accordance with an embodiment of the disclosure.

FIG. 3A illustrates exemplary operations for personalized fitness activity training using augmented-reality based avatar, in accordance with an embodiment of the disclosure. FIG. 3A is explained in conjunction with elements from FIGS. 1 and 2. With reference to FIG. 3A, there is shown a block diagram 300A that illustrates exemplary operations from 302A to 302F, as described herein. The exemplary operations illustrated in the block diagram 300A may start at 302A and may be performed by any computing system, apparatus, or device, such as by the electronic device 102 of FIG. 1 or the circuitry 202 of FIG. 2. Although illustrated with discrete blocks, the exemplary operations associated with one or more blocks of the block diagram 300A may be divided into additional blocks, combined into fewer blocks, or eliminated, depending on the particular implementation.

At 302A, a user profile of the first user 118 may be created. In an embodiment, the circuitry 202 may be configured to create a user profile of the first user 118. To create the user profile, the circuitry 202 may receive an initial user input 304 associated with a set of body parameters of the first user 118. The set of body parameters of the first user 118 may include an age of the first user 118, a height of the first user 118, a weight of the first user 118, a body mass index of the first user 118, a gender of the first user 118, a waist size of the first user 118, a size of arms of the first user 118, a chest size of the first user 118, and the like.

In another embodiment, the received initial user input 304 may be further associated with at least one of a fitness goal (for example, weight loss, weight gain, stamina, etc.) of the first user 118, a medical condition of the first user 118, an experience level of the first user 118 in performing the first fitness activity, and so on. The fitness goal of the first user 118 may include a time period for achieving the fitness goal. For example, the fitness goal of the first user 118 may be losing a specific amount of weight in a specific time period (for example, lose 22 pounds or 10 kilograms in 3 months). The medical conditions of the first user 118 may include one or more pre-existing diseases or conditions of the first user 118. The experience level of the first user 118 may indicate the number of hours of the first fitness activity or an experience level associated with the first fitness activity.

In another embodiment, the received initial user input 304 may be associated with the user profile of the first user 118. The user profile of the first user 118 may include the set of body parameters of the first user 118, the fitness goal of the first user 118, the medical conditions of the first user 118, and the experience level of the first user 118, and other parameters that the first NN model 106 may require to generate the first avatar 120 and the fitness routine of the first user 118. In some other embodiments, the circuitry 202 may be further configured to acquire a performance history of the first user 118 associated with one or more previous fitness activities performed by the first user 118.

At 302B, a data acquisition operation may be performed. In the data acquisition operation, the circuitry 202 may be configured to receive a first user input 306 for selection of the first fitness activity from a set of fitness activities. The circuitry 202 may receive the selection of the first fitness activity from suggestions of one or more fitness activities by the first NN model 106 based on the category of exercise (such as aerobics, Yoga, strength training, etc.) recommended in the fitness routine of the first user 118. For example, the circuitry 202 may control the display device 108 to display a graphical user interface (such as a dropdown box or a selection box) that lists the one or more fitness activities for selection, and may receive the user selection based on user input via a remote control, a handheld controller, or a touch input. Based on the reception of the first user input 306, the circuitry 202 may be configured to control the set of image sensors 104 to capture the first set of images 116 of the first user 118. The first set of images 116 may be captured for the duration in which the first user 118 may be engaged in the first fitness activity. In another embodiment, the circuitry 202 may be configured to control playback of audio content on one or more audio rendering devices associated with the electronic device 102 based on the reception of the first user input 306. The playback of the audio content may simulate a gymnasium ambience for the first fitness activity, and/or may set the tempo for the first fitness activity.

At 302C, an augmented-reality display may be generated. In an embodiment, the circuitry 202 may be configured to generate the augmented-reality display 114. The circuitry 202 may be configured to generate the augmented-reality display 114 based on the first set of images 116 of the first user 118. The generated augmented-reality display 114 may include the first avatar 120 and the live image of the first user 118 from the first set of images 116. In the generated augmented-reality display 114, the first avatar 120 and the live image of the first user 118 may be combined in a real 3D world environment, where the first avatar 120 may enable real-time interaction with the first user 118.

In an embodiment, the first avatar 120 may be a virtual and animated three-dimensional (3D) graphical representation of the first user 118 that may be customized to a persona of the first user 118. In another embodiment, the first avatar 120 may be a virtual and animated three-dimensional (3D) graphical representation of a generic human body with universal features. For example, the circuitry 202 may be configured to generate the first avatar 120 based on the first set of images 116, the set of body parameters of the first user 118, and the user profile of the first user 118. The first avatar 120 may be a personalized graphical representation of the first user 118, and may be represented in either three-dimensional (3D) form or two-dimensional (2D) form. For example, the appearance of the first avatar 120 may be similar to appearance of the first user 118. For example, a height and a shape of the body of the first avatar 120 may be similar to the height and the shape of the body of the first user 118.

At 302D, an augmented-reality display rendering operation may be performed. In the augmented-reality display rendering operation, the circuitry 202 may be configured to control the display device 108 to render the generated augmented-reality display 114. The rendered augmented-reality display 114 may include the first avatar 120 that may be configured to demonstrate the first fitness activity on the display device 108. For example, the circuitry 202 may control the first avatar 120 according to pre-recorded animations associated with the selected first fitness activity.

In another embodiment, the circuitry 202 may be configured to determine the first position of the first user 118 in the augmented-reality display 114 based on the captured first set of images 116. The circuitry 202 may be configured to control the display device 108 to render the first avatar 120 at a second position in the augmented-reality display 114 based on the determined first position. For example, the circuitry 202 may control the display device 108 to display the first avatar 120 adjacent to and spaced apart from the live image of the first user 118 in the augmented-reality display 114. The distance between the live image of the first user 118 and the first avatar 120 may depend on the type of the fitness activity, the number of users in the augmented-reality display 114, or the screen real estate of the display device 108. In an embodiment, the circuitry 202 may control the first avatar 120 to start the first fitness activity based on a user cue such that the first user 118 may copy the movements of the first avatar 120 to start preforming the first fitness activity. In an embodiment, in a case where the display device 108 is part of a smart phone, the augmented-reality display 114 may be mirrored/casted on a larger display device (such as a television) such for a better user experience.

In another embodiment, the circuitry 202 may be configured to receive sensor data associated with biological information of the body of the first user 118 during the performance of the first fitness activity by the first user 118. In an embodiment, the sensor data may be received from a wearable device (such as a fitness tracker) or one or more sensors that may be worn by the first user 118 while the first user 118 is engaged in the first fitness activity. Each of the one or more sensors may include suitable logic, circuitry, and/or interfaces that may be configured capture the sensor data associated with biological information (or biomarkers) and/or biomechanics of the body of the first user 118. Examples of such sensors may include, but are not limited to, a breathing rate sensor, a heart rate sensor, a pulse rate sensor, a blood pressure sensor, an oxygen saturation sensor, etc.

At 302E, a second NN model may be applied. In an embodiment, the circuitry 202 may be configured to apply the second NN model 210 on the first set of images 116. The second NN model 210 may be applied on the first set of images 116 to determine posture information of the first user 118 for the duration of the first fitness activity. The second NN model 210 may output the posture information (or pose) of the first user 118 for the duration of the first fitness activity. By way of example and not limitation, the second NN model 210 may correspond to OpenPose model or any other real-time pose estimation algorithm.

At 302F, posture information may be determined. In an embodiment, the circuitry 202 may be configured to determine the posture information of the first user 118 for the duration of the first fitness activity, based on the application of the second NN model 210. The posture information may indicate a posture of the first user 118 in each of the first set of images 116. For example, the posture information may include a plurality of key points 308 corresponding to parts and/or joints (such as elbow, wrist, shoulder, neck, head, eyes, hip, knee, ankle, etc.) of the body of the first user 118.

Figure 3B:
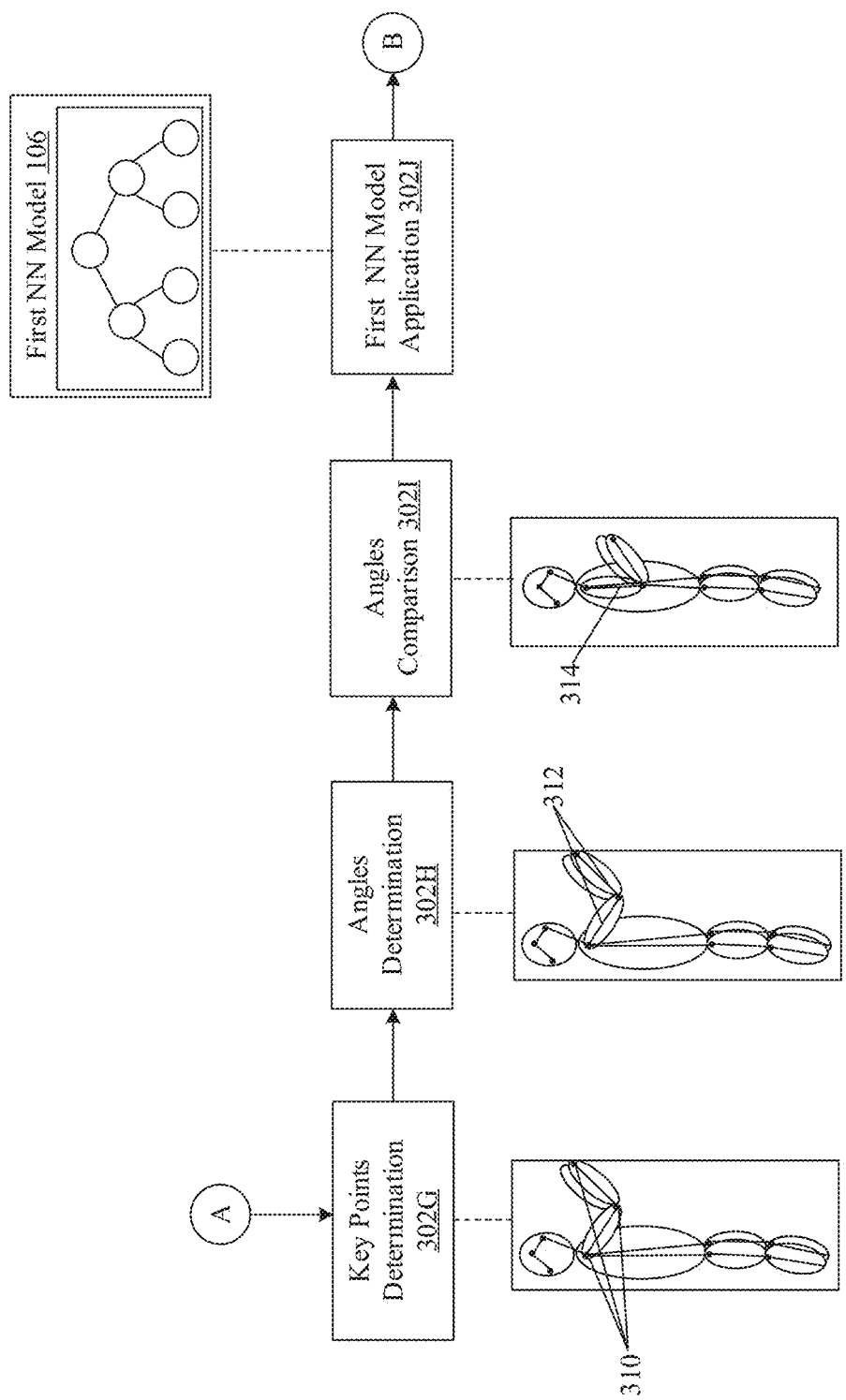

FIG. 3B illustrates exemplary operations for personalized fitness activity training using augmented-reality based avatar, in accordance with an embodiment of the disclosure. FIG. 3B is explained in conjunction with elements from FIGS. 1, 2, and 3A. With reference to FIG. 3B, there is shown a block diagram 300B that illustrates exemplary operations from 302G to 302J, as described herein. The exemplary operations illustrated in the block diagram 300B may start at 302G and may be performed by any computing system, apparatus, or device, such as by the electronic device 102 of FIG. 1 or the circuitry 202 of FIG. 2. Although illustrated with discrete blocks, the exemplary operations associated with one or more blocks of the block diagram 300B may be divided into additional blocks, combined into fewer blocks, or eliminated, depending on the particular implementation.

At 302G, a set of key points may be determined. In an embodiment, the circuitry 202 may be configured to determine a set of key points from the plurality of key points 308 based on the selected first fitness activity at 302B. The set of key points may be associated with a particular fitness activity, and may differ from one fitness activity to another. For example, a first set of key points 310 may be associated with the first fitness activity. For example, the first set of key points 310 may include key points related to elbows, wrists (or the radiocarpal joints), shoulder (or the glenohumeral joint), and the hip among the plurality of key points 308 in a case where the first fitness activity is bicep curls. In another example, the first set of key points 310 may include key points related to neck, shoulder, hip, and knees in a case where the first fitness activity is running or walking. In an embodiment, the circuitry 202 may determine the perspective or the angle of view from which the posture information and the first set of key points 310 are obtained. The circuitry 202 may determine the perspective to inform the first user 118 to change the position and orientation of the body of the first user 118 with respect to the set of image sensors 104 such that the detected posture information is suitable for posture evaluation (for example, comparison with a reference posture). In another embodiment, the circuitry 202 may determine the perspective to apply a normalization process or a conversion process on the first set of key points 310 such that the detected posture information is suitable for the posture evaluation.

At 302H, one or more angles between lines joining the set of key points may be determined. In an embodiment, the circuitry 202 may be configured to determine a set of coordinate values associated with the determined first set of key points 310. Each of the set of coordinate value may be associated with a corresponding key point of the first set of key points 310 and may indicate a position of the corresponding key point with respect to other key points in a 3D space. Based on the determined the set of coordinate values, the circuitry 202 may be configured to determine one or more angles between lines 312 connecting the set of coordinate values. Typically, in bicep curls, a dumbbell is lifted up by an arm from a resting and extended position, with a rotation around the elbow, while other parts of the body are kept still. This action of the bicep curls targets the biceps muscle. One common mistake in bicep curls includes using the shoulder to help swing the weight up, thus causing a rotation of the shoulder. Other common mistakes in bicep curls include lifting the weight partially or swinging the upper torso along with the arms. Accordingly, in a case where the first fitness activity is bicep curls, the circuitry 202 may be configured to determine the angle between the upper arm (for example, the line joining the shoulder and elbow key points) and the torso (for example, the line joining the shoulder and hip key points) of the first user 118. The angle between the upper arm and the torso may indicate whether the shoulder is rotated while lifting the weight. The circuitry 202 may further determine the minimum angle between the upper arm and the forearm (for example, the line joining the wrist and elbow key points) of the first user 118. The minimum angle between the upper arm and the forearm when the weight is lifted up may indicate whether the extent of the lift is partial or full. In an embodiment, the circuitry 202 may be configured to store the determined one or more angles in the memory 204 for further processing.

At 302I, the angles may be compared with reference angles. In an embodiment, the circuitry 202 may be configured to compare the determined one or more angles with a set of reference angles of a reference posture 314. The reference posture may correspond to a posture of an experienced user who may be an expert in performing the first fitness activity. In an embodiment, the reference posture 314 may correspond to a ground truth posture with respect to the first NN model 106. The reference posture 314 may include the set of reference angles between the first set of key points 310. By way of example, the reference posture may include a first reference angle and a second reference angle. The first reference angle between the torso and upper arm may be in the range of 0 to 35 degrees, and may be characterized as a good posture for bicep curls by the first NN model 106. The second reference angle between the forearm and upper arm when the weight is lifted up may be in the range of 45 to 70 degrees, and may be characterized as a good posture for bicep curls by the first NN model 106. The comparison between the determined one or more angles and the set of reference angles may indicate a deviation of the posture of the first user 118 and the reference posture 314.

At 302J, a first NN model 106 may be applied. In an embodiment, the circuitry 202 may be configured to apply the first NN model 106 on the determined first set of key points 310. The first NN model 106 may be configured to generate a classification result. In some embodiments, the first NN model 106 may generate the classification result based on the comparison of the determined one or more angles associated with the first user 118 with the set of reference angles associated with the reference posture 314.

In another embodiment, the circuitry 202 may be configured to apply the first NN model 106 on the result of the comparison between the determined one or more angles associated with the first user 118 with the set of reference angles. The first NN model 106 may output the classification result based on the comparison result. The classification result may be used to classify or label the posture information of the first user 118 into one of a good posture or a bad posture based on the determined one or more angle between the first set of key points 310 and the set of reference angles between the first set of key points 310. In an embodiment, the algorithm associated with the first NN model 106 may be modified during the training phase (or re-training phase) to adjust a decision boundary between good posture and bad posture to ease the strictness for evaluation of the posture information. In another embodiment, the first NN model 106 may be trained with different training datasets such that the decision boundary between good posture and bad posture may be changed at run time.

In another embodiment, the circuitry 202 may be configured to provide the first user profile of the first user 118 as input to the first NN model 106. For example, the first user profile may include information about the set of body parameters of the first user 118, the fitness goal of the first user 118, the medical condition of the first user 118, the experience level of the first user 118 in performing the first fitness activity, the performance history of the first user 118 associated with one or more previous fitness activities of the first user 118, and the like. In another embodiment, the circuitry 202 may be further configured to apply the first NN model 106 on the user profile and the sensor data associated with the biological information of the first user 118.

Based on the application of the first NN model 106, the circuitry 202 may classify the posture of the first user 118 as bad posture in a case where the determined angle between the upper arm and the forearm of the first user 118 is above 70 degrees, indicating that the weight is not lifted fully up. The circuitry 202 may classify the posture of the first user 118 as good posture in a case where the determined angle between the upper arm and the forearm of the first user 118 is less than 70 degrees. The circuitry 202 may further classify the posture of the first user 118 as bad posture in a case where the determined angle between the shoulder and upper arm is greater than 35 degrees, indicating that the shoulder is rotated to help carry the weight up. The circuitry 202 may further classify the posture of the first user 118 as good posture in a case where the determined angle between the shoulder and upper arm is less than 35 degrees.

In some embodiments, the first NN model 106 may be trained to classify the posture information associated with the first fitness activity. In such scenarios, the electronic device 102 may include a set of neural network models each corresponding to a fitness activity of a plurality of fitness activities. In another embodiment, the first NN model 106 may be trained to classify the posture information associated with the each of the plurality of fitness activities.

Figure 3C:
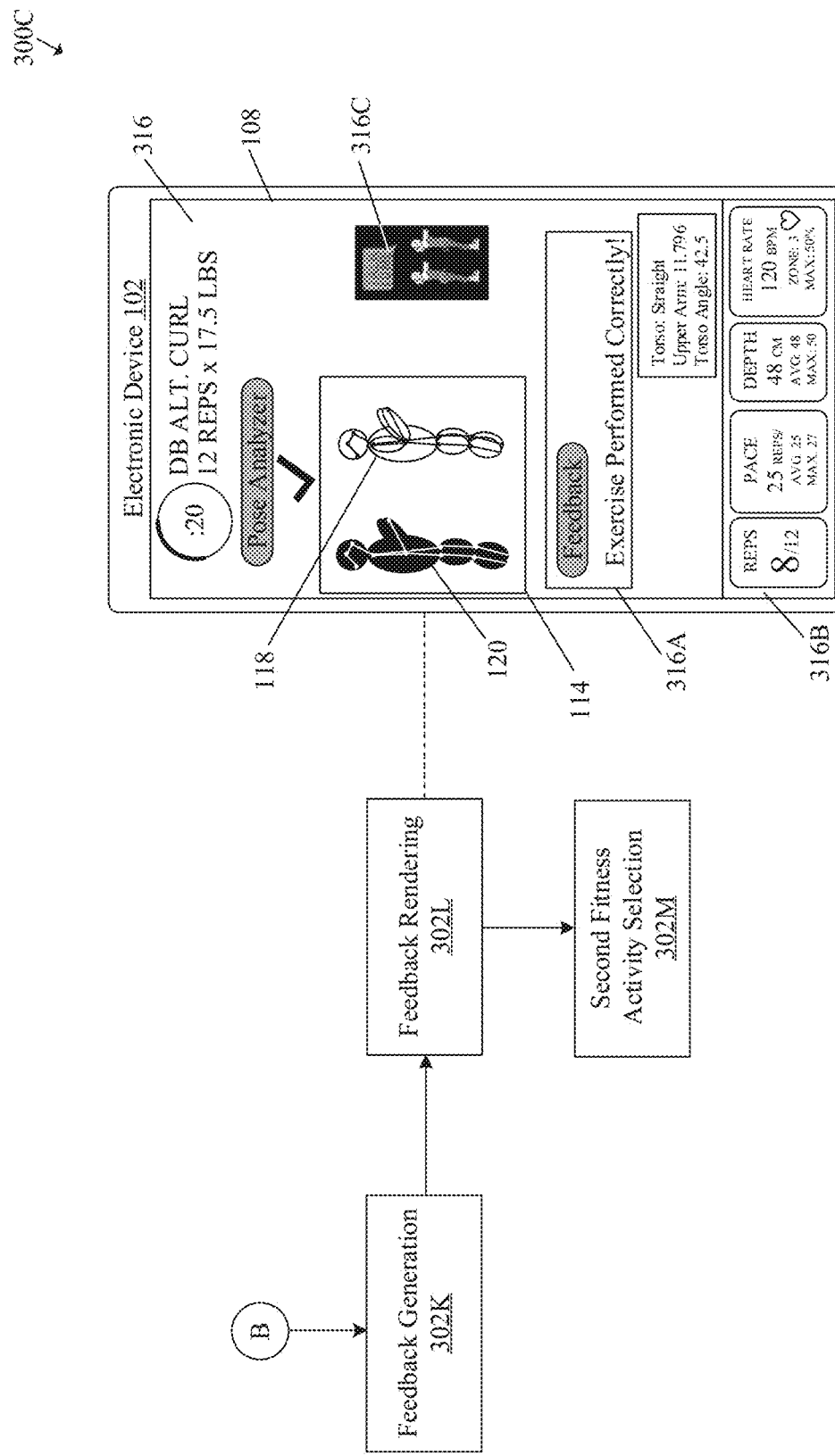

FIG. 3C illustrates exemplary operations and user interface for personalized fitness activity training using augmented-reality based avatar, in accordance with an embodiment of the disclosure. FIG. 3C is explained in conjunction with elements from FIGS. 1, 2, 3A, and 3B. With reference to FIG. 3C, there is shown a block diagram 300C that illustrates exemplary operations from 302K to 302M, as described herein. The exemplary operations illustrated in the block diagram 300C may start at 302K and may be performed by any computing system, apparatus, or device, such as by the electronic device 102 of FIG. 1 or the circuitry 202 of FIG. 2. Although illustrated with discrete blocks, the exemplary operations associated with one or more blocks of the block diagram 300C may be divided into additional blocks, combined into fewer blocks, or eliminated, depending on the particular implementation.

At 302K, a real-time feedback may be determined. In an embodiment, the circuitry 202 may be configured to determine the real-time feedback based on the application of the first NN model 106 on the posture information and the determined first set of key points 310. The real-time feedback may be determined in response to performance of the first fitness activity by the first user 118. For example, circuitry 202 may determine the real-time feedback based on the classification result associated with the posture of the first user 118. In an embodiment, the determined real-time feedback may be associated with at least one of a movement of one or more parts of a body of the first user 118, the posture of the first user 118, a number of repetitions of the first fitness activity, the duration of the first fitness activity, or a breathing pattern of the first user 118 during the first fitness activity. In an example, the real-time feedback associated with the movement of one or more parts of the body of the first user 118 may inform the first user 118 to lift the weight higher such that the angle between the upper arm and the forearm is less than 70 degrees. In another example, the real-time feedback associated with the posture of the first user 118 may inform the first user 118 to limit the rotation of the shoulder during bicep curls such that the bicep curls effectively targets the biceps muscle. In another example, the real-time feedback associated with the posture of the first user 118 may inform the first user 118 to keep user's back straight during the first fitness activity such that the first user 118 does not injure user's back.

In another example, the real-time feedback associated with the number of repetitions of the first fitness activity and the duration of the first fitness activity may inform the first user 118 to increase or decrease the number of repetitions or the duration of the first fitness activity. For example, in the first attempt, the first user 118 may perform the first fitness activity for a first duration (for example, 30 seconds) or may perform the first fitness activity for a first number of repetitions (for example, 10 repetitions). In the second attempt, the circuitry 202 may determine a second duration (for example, 60 seconds) or a second number of repetitions (for example, 12 repetitions) of the first fitness activity as the real-time feedback. In an embodiment, the real-time feedback associated with the number of repetitions of the first fitness activity and the duration of the first fitness activity may be based on the fitness goal of the first user 118, the medical condition of the first user 118, or the experience level of the first user 118 in performing the first fitness activity.

In another example, the real-time feedback associated with a breathing pattern of the first user 118 may inform the first user 118 to change user's breathing pattern (breathing cycle) from a first breathing pattern to a second breathing pattern. For example, the circuitry 202 may detect that the first user 118 may be exhaling while lifting the weight and inhaling while dropping the weight in the first breathing pattern. The circuitry 202 may determine the second breathing pattern, in which the first user 118 has to inhale while lifting the weight and exhale while dropping the weight, as the real-time feedback. In another example, the real-time feedback associated with the breathing pattern of the first user 118 may inform the first user 118 to consciously continue breathing while performing the first fitness activity, based on the detected breathing pattern of the first user 118.

In another embodiment, the determined real-time feedback may include a motivational phrase based on the performance of the first user 118. For example, in a case where the movement of one or more parts of the body of the first user 118, the posture of the first user 118, the number of repetitions of the first fitness activity, the duration of the first fitness activity, and the breathing pattern of the first user during the first fitness activity is close to ideal reference values, the determined real-time feedback may include the motivational phrase to encourage the first user 118 to continue the same exercise pattern. In another example, the determined real-time feedback may include the motivational phrase to motivate the first user 118 to complete the required number of repetitions.

At 302L, the determined real-time feedback may be rendered. In an embodiment, the circuitry 202 may be configured to control the first avatar 120 to output the determined real-time feedback in the augmented-reality display 114. In an embodiment, the circuitry 202 may be configured to output the determined real-time feedback in the form of one of the movement of the first avatar 120 in the augmented-reality display 114, a synthesized speech, or a textual feedback. In a case where the circuitry 202 determines a deviation between the posture of the user and the reference posture 314, the circuitry 202 may control the first avatar 120 to demonstrate the correct posture such that the first user 118 may copy the movement of the first avatar 120. The posture and movement of the first avatar 120 may be similar to the posture and movement of an expert in performing the first fitness activity. In an embodiment, the circuitry 202 may control the display device 108 to pause the ongoing animation of the first avatar 120, and cause the first avatar 120 to re-demonstrate the correct posture for one or more portions of the first fitness activity using other animations (such as other views or closeup views). The electronic device 102 may also output verbal feedback (such as feedback on posture, feedback on tempo, feedback on breathing pattern, and so on).

In a case where the real-time feedback is associated with the number of repetitions of the first fitness activity, the duration of the first fitness activity, or the breathing pattern of the first user 118 during the first fitness activity, the circuitry 202 may be configured to output the determined real-time feedback as the synthesized speech and/or the textual feedback. The circuitry 202 may be configured to output the motivational phrase as the synthesized speech. In some embodiments, the circuitry 202 may control an audio rendering device (such as speakers) associated with the electronic device 102 to output the motivational phrase.

In an embodiment, the circuitry 202 may generate and output a graphical user interface 316 on the display device 108 to render the determined real-time feedback. The graphical user interface 316 may include the augmented-reality display 114, the textual feedback 316A, and one or more UI elements. For example, the textual feedback 316A may include the phrase "Exercise performed correctly", and may indicate that the posture related to a specific body part has been corrected. The textual feedback 316A may further indicate whether the torso is straight, the angle between the torso and the upper arm, and so on. For example, the one or more UI elements of the graphical user interface 316 may include a countdown timer for counting down the duration of the first fitness activity, a progress bar showing the progress of the first user 118 with respect to the first fitness activity and the transitions between fitness activities, an icon or text indicating the type of the first fitness activity along with the number of repetitions and the weight of the dumbbell. The one or more UI elements of the graphical user interface 316 may further include a statistics bar 316B that indicates the number of repetitions performed, the pace at which the first fitness activity is performed, the depth of the first fitness activity, heart rate of the first user 118, and so on. The one or more UI elements of the graphical user interface 316 may further include an icon 316C "talk to me" that may be pressed to receive speech input from the first user 118 to ask the first avatar 120 to demonstrate the first fitness activity or verbally guide the first user 118 through the first fitness activity. The graphical user interface 316 may further include a leaderboard that may list the top performers of the first fitness activity in terms of number of repetitions or number of hours over a period of time.

At 302M, a second fitness activity may be selected. In an embodiment, the circuitry 202 may receive a second user input for selection of the second fitness activity (for example, reverse curl or dumbbell chest press) from the set of fitness activities. The circuitry 202 may be further configured to determine a second set of key points from the plurality of key points 308 based on the selection of the second fitness activity. The second set of key points may be different than the first set of key points 310. The circuitry 202 may be further configured to apply the first NN model 106 on the second set of key points to classify the posture of the first user 118. The circuitry 202 may be configured to determine first real-time feedback based on the classification, and may control the first avatar 120 to output the determined first real-time feedback in the augmented-reality display 114.

In another embodiment, the circuitry 202 may detect a set of users (for example two or more users) engaged in the first fitness activity. In such scenario, the circuitry 202 may be configured to receive a second set of images of the set of users engaged in the first fitness activity. The set of users may include the first user 118 and a second user. The circuitry 202 may be further configured to generate the augmented-reality display 114 that may include a set of avatars associated with the set of users. The set of avatars may include the first avatar 120 and a second avatar. The first avatar 120 may be associated with the first user 118, and may be configured to interact with the first user 118 in the augmented-reality display 114. The second avatar may be associated with the second user, and may be configured to interact with the second user in the augmented-reality display 114. The circuitry 202 may be further configured to determine the posture information associated with each user of the set of users based on the second set of images and the first fitness activity. The circuitry 202 may be further configured to determine the real-time feedback for each user of the set of users based on application of the first NN model 106 on the determined posture information associated with each user of the set of users. The circuitry 202 may be further configured to control the first avatar 120 and the second avatar to output the determined real-time feedback in the augmented-reality display 114. In another embodiment, the circuitry 202 may be configured to generate the augmented-reality display 114 that may include a single avatar (for example, the first avatar 120) with universal features, and may control the single avatar to guide and interact with each user of the set of users.

Figure 4:
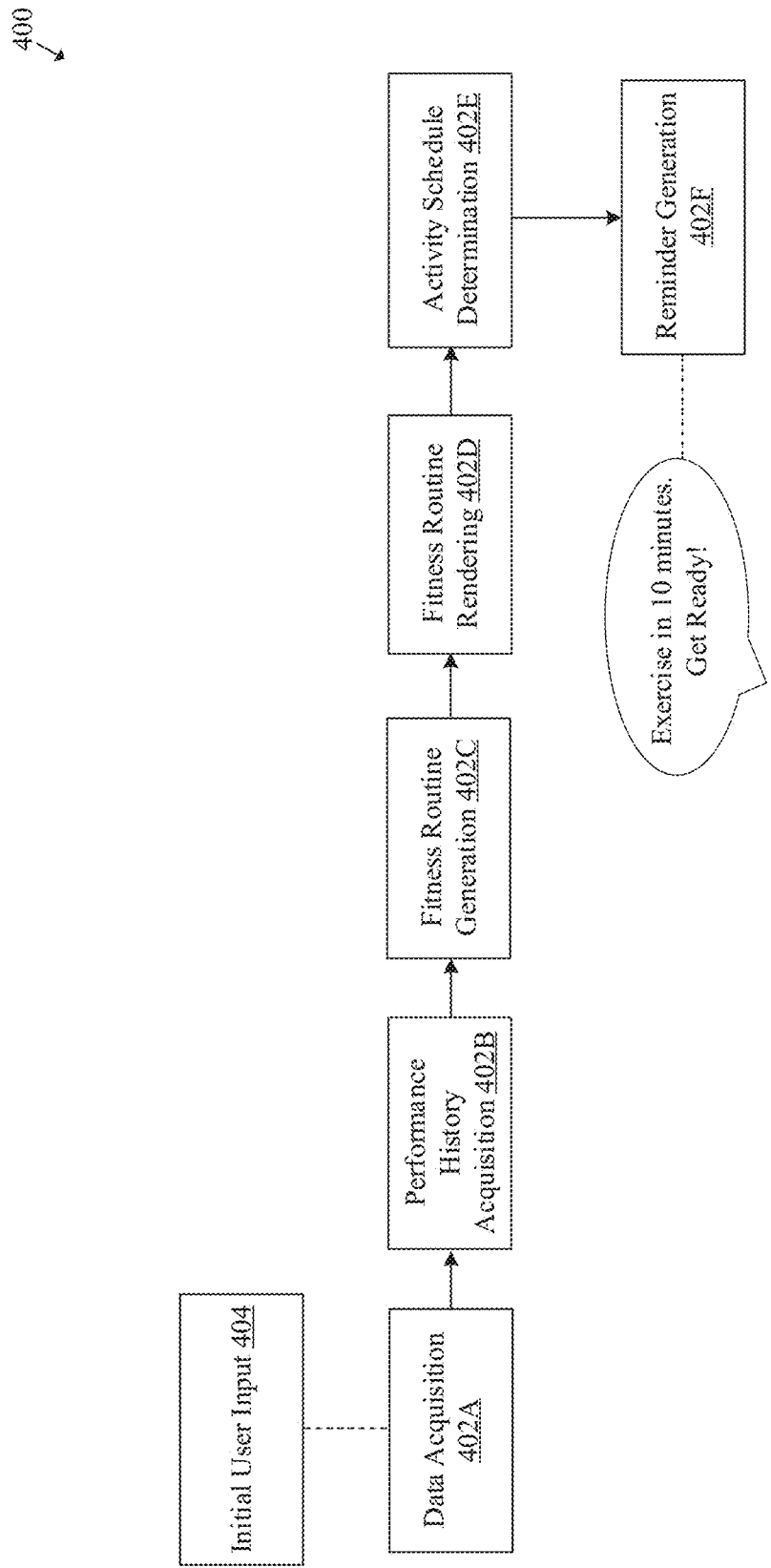
FIG. 4 is a diagram that illustrates exemplary operations for generation of a fitness routine and activity schedule for a first user, in accordance with an embodiment of the disclosure.

FIG. 4 is a diagram that illustrates exemplary operations for generation of a fitness routine and activity schedule for a first user, in accordance with an embodiment of the disclosure. FIG. 4 is explained in conjunction with elements from FIG. 1, FIGS. 2, and 3A-3C. With reference to FIG. 4, there is shown a block diagram 400 that illustrates exemplary operations from 402A to 402F, as described herein. The exemplary operations illustrated in the block diagram 400 may start at 402A and may be performed by any computing system, apparatus, or device, such as by the electronic device 102 of FIG. 1 or the circuitry 202 of FIG. 2. Although illustrated with discrete blocks, the exemplary operations associated with one or more blocks of the block diagram 400 may be divided into additional blocks, combined into fewer blocks, or eliminated, depending on the particular implementation.

At 402A, data acquisition may be performed. In an embodiment, the circuitry 202 may be configured to receive an initial user input 404 associated with at least one of the set of body parameters of the first user 118, the user profile of the first user 118, the fitness goal of the first user 118, the medical condition of the first user 118, or the experience level of the first user 118 in performing the first fitness activity. The set of body parameters of the first user 118 may include an age of the first user 118, a height of the first user 118, a weight of the first user 118, a gender of the first user 118, a waist size of the first user 118, a size of arms of the first user 118, and the like. The fitness goal of the first user 118 may be correspond to a goal of the first user 118 associated with the fitness of the first user 118 and may be associated with a time period. The medical conditions of the first user 118 may include one or more pre-existing diseases of the first user 118. The experience level of the first user 118 may indicate an experience of the first user 118 in performing the first fitness activity. In an embodiment, the user profile of the first user 118 may include information related to the set of body parameters of the first user 118, the fitness goal of the first user 118, the medical conditions of the first user 118, the experience level of the first user 118, and so on.

At 402B, a performance history may be acquired. In an embodiment, the circuitry 202 may be configured to acquire the performance history of the first user 118. The performance history of the first user 118 may be associated with one or more previous fitness activities of the first user 118. In an embodiment, the one or more previous fitness activities may include the first fitness activity. The performance history of the one or more previous fitness activities may include a name of the fitness activity, a number of days for which the fitness activity has been performed by the first user 118, a time duration for which the corresponding fitness activity has been performed per session, a number of repetitions of the fitness activity, one or more injuries sustained by the first user 118 due to the fitness activity, the past fitness goal associated with fitness activity, and the like.

At 402C, a fitness routine may be generated. In an embodiment, the circuitry 202 may be configured to generate the fitness routine for the first user 118 based on one of the received initial user input 404 or the acquired performance history. The generated fitness routine may include a suggestion of one or more potential fitness activities based on at least one of the received user input and/or the performance history. The one or more potential fitness activities may include the first fitness activity. In an embodiment, the one or more potential fitness activities may be suggested to achieve the fitness goal. In another embodiment, the circuitry 202 may generate a diet plan for the first user 118 that augments with the fitness routine. The diet plan may include information related a variety of foods that have to be consumed by the first user 118 to achieve the fitness goal. The diet plan may also include time of day information associated with the food to be consumed by the first user 118. Examples of the fitness routine and the diet plan are shown in Table 1.

At 402D, the fitness routine may be rendered. In an embodiment, the circuitry 202 may be configured to output the generated fitness routine on the display device 108 or a user device (for example, a mobile phone) associated with the first user 118. In an embodiment, the circuitry 202 may be configured to output a detailed form of the fitness routine on the graphical user interface, shown in FIG. 3C.

At 402E, an activity schedule may be determined. In an embodiment, the circuitry 202 may be configured to determine the activity schedule for performing the first fitness activity by the first user 118. The activity schedule may be determined based on the generated fitness routine. In an embodiment, the determined activity schedule may include a number of days/months for which the first fitness activity is to be performed, time information that may indicate a schedule (for example, time of day, duration, etc.) for the first fitness activity, and repetition information that may indicate a number of repetition of the first fitness activity. Examples of the activity schedule according to the fitness goal are shown in Table 1.

TABLE 1

Examples of Fitness Routine and Activity Schedule Determined by the Application of the First NN model 106 According to Fitness Goal

| Fitness Goal | Fitness routine | Activity schedule | Diet plan |
| --- | --- | --- | --- |
| Lose 22 pounds/10 kilograms in 3 months | Aerobic exercises/ Cardio/Strength training 4 days a week. Yoga 2 days a week | Mon 8 AM: Warm up + Cardio (dance form) for 15 mins<br>Tue 8 AM: Warm up + Spin class for 15 mins<br>Wed 8 AM: Yoga<br>Thu 8 AM: Warm up + Treadmill for 15 mins<br>Fri 8 AM: Yoga<br>Sat: Warm up + Strength Exercise for 15 mins<br>Sun: Rest | 3 meals a day spaced at least 5 hours apart with one meal including salad only. Reduce calorie intake by 20% in a week. |
| Gain 10 pounds/5 kilograms in muscle mass in 2 months | Weight training/ Strength training 5 days a week. | Mon 5 PM: Warm up + Biceps and triceps workout 30 reps each<br>Tue 5 PM: Warm up + Chest workout 30 reps<br>Wed 5 PM: Warm up + Abs workout 30 reps<br>Thu: Rest<br>Fri 5 PM: Warm up + Legs workout 40 reps<br>Sat 5 PM: Warm up + Shoulder workout 40 reps<br>Sun: Rest | 4 meals a day spaced at least 4 hours apart including one meal rich in protein (meat, eggs, almonds, sprouts, etc.) and one snack one hour before exercise. Increase calorie intake by 20% in a week. Optional protein supplements twice a week |

TABLE 1-continued

Examples of Fitness Routine and Activity Schedule Determined by the Application of the First NN model 106 According to Fitness Goal

| Fitness Goal | Fitness routine | Activity schedule | Diet plan |
|---|---|---|---|
| Run 5k marathon in 6 months | Running/ Technique/ Strength training 5 days a week. | Mon 7 AM: Warm up + treadmill for 30 mins (includes posture training) Tue 7 AM: Warm up + 600 m run Wed 7 AM: Rest Thu 7 AM: Indoor strength training for legs Fri 7 AM: Warm up + 800 m run Sat 7 AM: Warm up + 1K run Sun: Rest | with breakfast. 3 meals a day spaced at least 5 hours apart with one meal rich in protein (meat, eggs, almonds, sprouts, etc.). Increase calorie intake by 20% in a week. |

As shown in table 1, the circuitry 202 may receive the fitness goal as user input, and may determine the fitness routine and corresponding activity schedule and diet plan for achieving the fitness goal. For example, in a case where the fitness goal includes "Lose 22 pounds/10 kilograms in 3 months", the circuitry 202 may apply the first NN model 106 on the user input and the other factors (for example, the set of body parameters such as weight and height, the user profile, the medical condition, the experience level, age, gender, and so on) to determine the optimum activity schedule and diet plan for achieving the fitness goal. For example, in a case where the fitness goal includes losing weight, the circuitry 202 may determine a fitness routine that includes aerobics/strength training for 4 days a week and Yoga for 2 days a week. In a case where the fitness goal includes gaining weight through an increase in muscle mass, the circuitry 202 may determine a fitness routine that includes weight training and strength training for 5 days a week. In a case where the fitness goal includes running a marathon, the circuitry 202 may determine a fitness routine that includes running, technique, and strength training for 5 days a week. Table 1 shows examples of the corresponding activity schedule and diet plan that may be determined by the application of the first NN model 106, and may emulate the fitness routine and the activity schedule that may be set by an experienced trainer. It may be noted that the first NN model 106 may determine different fitness routines and diet plans for user with different body parameters, ages, gender, and so on.

At 402F, one or more reminders may be generated. In an embodiment, the circuitry 202 may be configured to periodically generate and output one or more notifications to the user device associated with the first user 118 based on the determined activity schedule. The notifications may include one of a reminder to perform the first fitness activity or a status of the first fitness activity with respect to the fitness goal. For example, the circuitry 202 may be configured to output a first notification (for example, "exercise in 10 minutes. Get ready!) to remind the first user 118 about the first fitness activity before the scheduled time according to the generated activity schedule. In another example, in a case where the fitness goal is to gain muscle mass, the circuitry 202 may be configured to output a second notification (for example, "It's almost 4 PM. Have a healthy snack now!) to remind the first user 118 to consume a healthy snack one hour before the exercise at 5 PM according to the diet plan.

Figure 5:
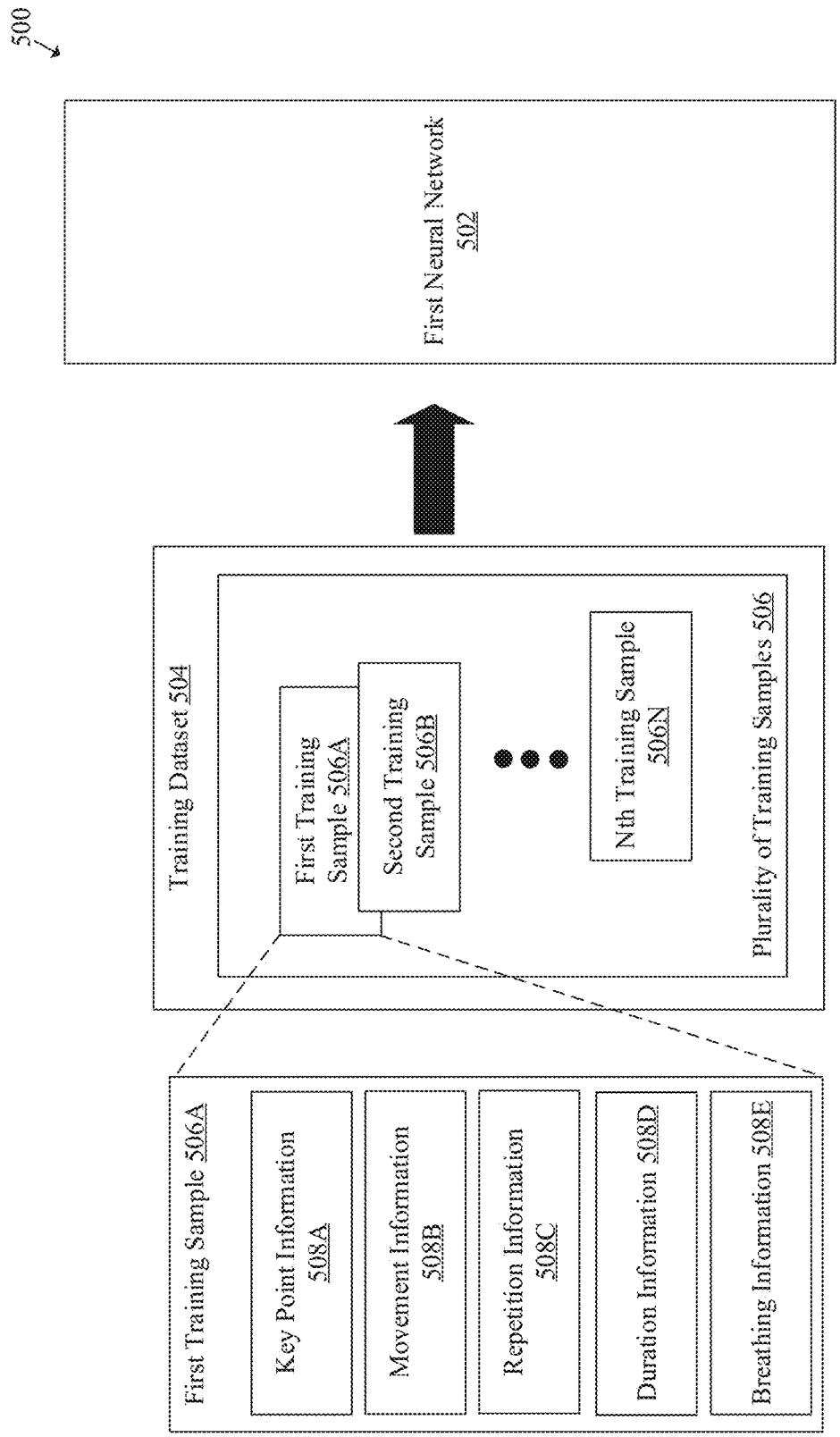
FIG. 5 is a diagram that illustrates training of a first neural network model to determine real-time feedback for a first fitness activity of a first user, in accordance with an embodiment of the disclosure.

FIG. 5 is a diagram that illustrates training of a first neural network model to determine real-time feedback for a first fitness activity of a first user, in accordance with an embodiment of the disclosure. FIG. 5 is explained in conjunction with elements from FIGS. 1, 2, 3A-3C, and 4. With reference to FIG. 5, there is shown a block diagram 500. In the block diagram 500, there is shown a first neural network (NN) model 502, and a training dataset 504. The training dataset 504 may include a plurality of training samples 506. The plurality of training samples includes a first training sample 506A, a second training sample 506B, up to an Nth training sample 506N.

In an embodiment, the circuitry 202 may receive, from the server 110, the training dataset 504 that may include the plurality of training samples 506 for training of the first NN model 502. In another embodiment, the circuitry 202 may generate the training dataset 504 that may include the plurality of training samples 506 for training of the first NN model 502. Each of the plurality of training samples 506 may include one or more features that may be used by the first NN model 106 to determine real-time feedback for the first user 118. The one or more features may include, but is not limited to, a set of key points of the posture information for each fitness activity of a plurality of fitness activities, a movement of one or more body parts for each fitness activity, a number of repetitions for each fitness activity, a duration of each fitness activity, a breathing pattern associated with each fitness activity, and so on.

In an embodiment, the first training sample 506A may include key point information 508A associated with the set of key points of the ideal posture information for each fitness activity of the plurality of fitness activities, movement information 508B associated with the ideal movements of the one or more body parts for each fitness activity, repetition information 508C associated with the ideal number of repetitions for each fitness activity, duration information 508D associated with the ideal duration of each fitness activity, and breathing information 508E associated with the ideal breathing pattern associated with each fitness activity.

In an embodiment, the first NN model 502 may be trained to determine the real-time feedback for a single fitness activity from the plurality of fitness activities. For example, the first NN model 502 may be trained to determine the real-time feedback associated with the first fitness activity (for example, bicep curls). To determine the real-time feedback associated with the first fitness activity, the first NN model 502 may be trained on the one or more features that may include the posture information for the first fitness activity, the movement of one or more body parts for the first fitness activity, the number of repetitions for the first fitness activity, the duration of the first fitness activity, the breathing pattern associated with the first fitness activity, and so on. In another embodiment, the first NN model 502 may be trained to classify the posture information for the plurality of fitness activities (for example, bicep curls, reverse curls, preacher curls, and so on) for a particular body part. In another embodiment, the first NN model 502 may be trained to classify the posture information for the plurality of fitness activities (for example, strength training, aerobics, Yoga, dance forms, and so on).

In an embodiment, the electronic device 102 may include a plurality of the neural network models. Each of the plurality of neural network models may be trained to classify the posture information of the user associated with each of the plurality of fitness activities. In another embodiment, a single neural network model of the plurality of neural network models may be trained to classify the posture information associated with one or more fitness activities of the plurality of activities. For example, a third NN model may be trained to classify the posture information associated with a second fitness activity (for example, dumbbell press). To classify the posture information associated with the second fitness activity, the third NN model may be trained on one or more features that may include the posture information for the second fitness activity, the movement of one or more body parts for the second fitness activity, the number of repetitions for the second fitness activity, the duration of the second fitness activity, and the breathing pattern associated with the second fitness activity.

Figure 6:
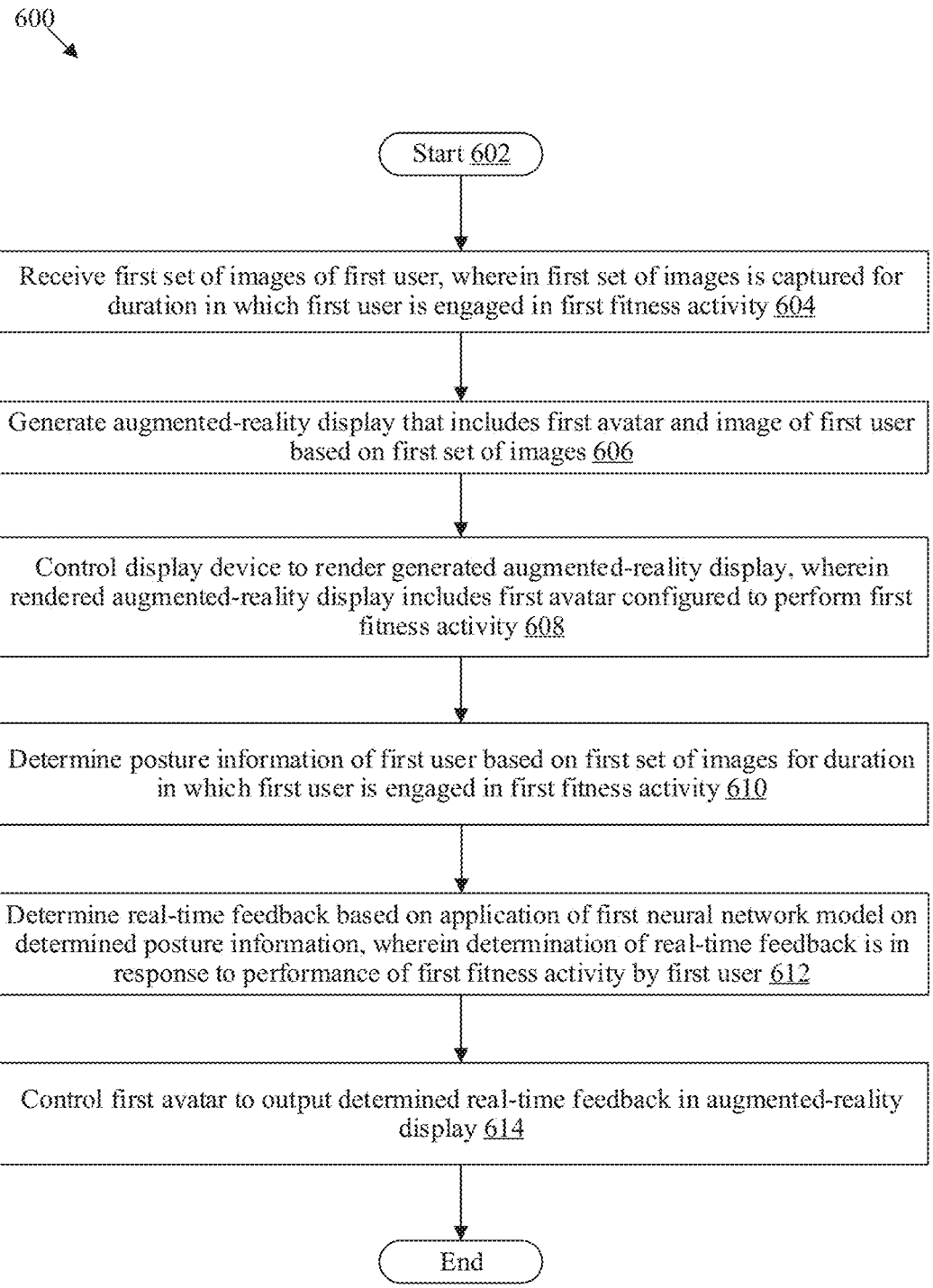
FIG. 6 is a first flowchart that illustrates exemplary operations for personalized fitness activity training using augmented-reality based avatar, in accordance with an embodiment of the disclosure.

FIG. 6 is a first flowchart that illustrates exemplary operations for personalized fitness activity training using augmented-reality based avatar, in accordance with an embodiment of the disclosure. FIG. 6 is explained in conjunction with elements from FIGS. 1, 2, 3A-3C, 4, and 5. With reference to FIG. 6, there is shown a flowchart 600. The operations from 602 to 614 may be implemented on any computing device, for example, the electronic device 102 or the circuitry 202. The operations may start at 602 and may proceed to 604.

At 604, a first set of images 116 of the first user 118 may be received, wherein the first set of images 116 may be captured for the duration in which the first user 118 may be engaged in the first fitness activity. In one or more embodiments, the circuitry 202 may be configured to receive the first set of images 116 of the first user 118. The details of the reception of the first set of images 116 of the first user 118 are provided for example, in FIGS. 1, and 3A.

At 606, an augmented-reality display 114 that includes the first avatar 120 and the image (for example, a live image) of the first user 118 may be generated based on the first set of images 116. In one or more embodiments, the circuitry 202 may be configured to generate the augmented-reality display 114 that includes the first avatar 120 and the image of the first user 118 based on the first set of images 116. The details of the generation of the augmented-reality display 114 are provided, for example, in FIGS. 1, and 3A.

At 608, a display device 108 may be controlled to render the generated augmented-reality display 114, wherein the rendered augmented-reality display 114 may include the first avatar 120 configured to perform the first fitness activity. In one or more embodiments, the circuitry 202 may be configured to control the display device 108 to render the generated augmented-reality display 114. The details of controlling the display device 108 are provided, for example, in FIGS. 1 and 3C.

At 610, posture information of the first user 118 may be determined based on the first set of images 116 for the duration in which the first user 118 may be engaged in the first fitness activity. In one or more embodiments, the circuitry 202 may be configured to determine the posture information of the first user 118 based on the first set of images 116 for the duration in which the first user 118 may be engaged in the first fitness activity. The details of the determination of the posture information are provided, for example, in FIG. 3.

At 612, real-time feedback may be determined based on application of a first neural network (NN) model 106 on the determined posture information, wherein the determination of the real-time feedback may be in response to performance of the first fitness activity by the first user 118. In one or more embodiments, the circuitry 202 may be configured to determine the real-time feedback based on application of the first NN model 106 on the determined posture information, as described in FIGS. 1, 3A-3C, and 5.

At 614, the first avatar 120 may be controlled to output the determined real-time feedback in the augmented-reality display 114. In one or more embodiments, the circuitry 202 may be configured to control the first avatar 120 to output the determined real-time feedback in the augmented-reality display 114. The details of the control of the first avatar 120 to output the determined real-time feedback in the augmented-reality display 114 are provided, for example, in FIGS. 1 and 3C. Control may pass to end.

Various embodiments of the disclosure may provide a non-transitory computer-readable medium and/or storage medium having stored thereon, instructions executable by a machine and/or a computer such as the electronic device 102. The instructions may cause the machine and/or computer to perform operations that may include reception of the first set of images 116 of the first user 118. The first set of images 116 may be captured for the duration in which the first user 118 is engaged in the first fitness activity. The operations may further include generation of the augmented-reality display 114 that may include the first avatar 120 and the image of the first user 118 based on the first set of images 116. The operations may further include controlling the display device 108 to render the generated augmented-reality display 114. The rendered augmented-reality display 114 may include the first avatar 120 configured to perform the first fitness activity. The operations may further include determining the posture information of the first user 118 based on the first set of images 116 for the duration in which the first user 118 may be engaged in the first fitness activity. The operations may further include determining real-time feedback based on application of the first neural network (NN) model 106 on the determined posture information. The determination of the real-time feedback may be in response to performance of the first fitness activity by the first user 118. The operations may further include controlling the first avatar 120 to output the determined real-time feedback in the augmented-reality display 114.

Exemplary aspects of the disclosure may include an electronic device (such as the electronic device 102 of FIG. 1) that may include circuitry (such as the circuitry 202). The circuitry 202 may be configured to control an image sensor of a set of image sensors (such as the set of image sensors 104) to capture a first set of images (such as the first set of images 116). The circuitry 202 may further receive the first set of images 116 of a first user (such as the first user 118). The first set of images 116 may be captured for a duration in which the first user 118 may be engaged in a first fitness activity. The circuitry 202 may be configured to generate an augmented-reality display (such as the augmented-reality display 114) that may include a first avatar (such as the first avatar 120) and an image of the first user 118 based on the first set of images 116. The circuitry 202 may be configured to determine a position of the first user 118 in the augmented-reality display 114 based on the captured first set of images 116. The circuitry 202 may be configured to control a display device (such as the display device 108) to render the generated augmented-reality display 114. The rendered augmented-reality display 114 may include the first avatar 120 that may be configured to perform the first fitness activity. In an embodiment, the circuitry 202 may be configured to control the display device 108 to render the first avatar 120 in the augmented-reality display 114 based on the determined position. In an embodiment, the circuitry 202 may be configured to detect a specific gesture of the first user based on the first set of images 116 to trigger the rendered first avatar 120 to start the first fitness activity.

In accordance with an embodiment, the circuitry 202 may be configured to apply a second neural network model (such as the second NN model 210) on the first set of images 116 to determine the posture information of the first user 118 for the duration of the first fitness activity. The posture information may include a plurality of key points (such as the plurality of key points 308) corresponding to joints of a body of the first user 118. The circuitry 202 may be configured to receive a user input for selection of the first fitness activity from a set of fitness activities. The circuitry 202 may be further configured to determine a first set of key points 310 from the plurality of key points 308 based on the selection of the first fitness activity. The circuitry 202 may be further configured to apply a first neural network model (such as the first NN model 106) on the determined first set of key points 310 to classify the posture information of the first user 118. The circuitry 202 may be further configured to determine the real-time feedback based on the classification.

In accordance with an embodiment, the circuitry 202 may be configured to determine a set of coordinate values associated with the determined first set of key points 310. The circuitry 202 may be further configured to determine one or more angles between lines connecting the set of coordinate values. The circuitry 202 may be further configured to compare the determined one or more angles with a reference posture, wherein the reference posture includes a set of reference angles between the first set of key points 310. The circuitry 202 may further generate a classification result based on the comparison. The circuitry 202 may be further configured to determine the real-time feedback based on the classification result.

In accordance with an embodiment, the circuitry 202 may be configured to receive a user input for selection of a second fitness activity from a set of fitness activities. The circuitry 202 may be configured to determine a second set of key points from the plurality of key points based on the selection of the second fitness activity. The circuitry 202 may be further configured to apply the first NN model 106 on the second set of key points to classify the posture information of the first user 118. The circuitry 202 may be further configured to determine the real-time feedback based on the classification.

In accordance with an embodiment, the circuitry 202 may be further configured to receive sensor data associated with biological information of a body of the first user 118. The circuitry 202 may be further configured to determine the real-time feedback based on the received sensor data. In an embodiment, the determination of the real-time feedback may be in response to performance of the first fitness activity by the first user 118.

In accordance with an embodiment, the circuitry 202 may be configured to control the first avatar 120 to output the determined real-time feedback in the augmented-reality display 114. In another embodiment, the circuitry 202 may be further configured to output the determined real-time feedback as one of a movement of the first avatar 120 in the augmented-reality display 114, a synthesized speech, or a textual feedback. The determined real-time feedback may be associated with at least one of a movement of one or more parts of a body of the first user 118, a posture of the first user 118, a number of repetitions of the first fitness activity, the duration of the first fitness activity, or a breathing pattern of the first user 118 during the first fitness activity. In another embodiment, the determined real-time feedback further may include a motivational phrase based on the performance of the first user 118. The circuitry 202 may be further configured to output the motivational phrase as a synthesized speech or a textual feedback.

In accordance with an embodiment, the circuitry 202 may be further configured to receive a user input associated with at least one of a set of body parameters of the first user 118, a user profile of the first user 118, a fitness goal of the first user 118, a medical condition of the first user 118, or an experience level of the first user 118 in performing the first fitness activity. The circuitry 202 may be further configured to acquire a performance history of the first user 118 associated with one or more previous fitness activities of the first user 118. The circuitry 202 may be further configured to generate a fitness routine that may include a suggestion of one or more potential fitness activities based on at least one of the received user input or the performance history. The one or more potential fitness activities may include the first fitness activity. The circuitry 202 may be configured to output the fitness routine on one of the display device 108 or a user device associated with the first user 118. In an embodiment, the circuitry 202 may be further configured to generate the first avatar 120 based on the set of body parameters of the first user 118 and the user profile of the first user 118.

In accordance with an embodiment, the circuitry 202 may be configured to determine an activity schedule for performing the first fitness activity by the first user 118 based on the fitness routine. The circuitry 202 may be configured to output one or more notifications periodically to the user device based on the determined activity schedule. The notifications may include one of a reminder to perform the first fitness activity or a status of the first fitness activity with respect to the fitness goal.

In accordance with an embodiment, the circuitry 202 may be configured to receive a second set of images of a set of users engaged in the first fitness activity. The set of users may include the first user 118 and a second user. The circuitry 202 may be further configured to generate the augmented-reality display 114 that includes a set of avatars associated with the set of users. The set of avatars may include the first avatar and a second avatar. The circuitry 202 may be further configured to determine the posture information associated with each user of the set of users based on the second set of images and the first fitness activity. The circuitry 202 may be further configured to generate the real-time feedback for each user of the set of users based on the determined posture information.

In accordance with an embodiment, the circuitry 202 may be configured to train the first NN model 106 on one or more features to classify the posture information of the first user 118 and to determine the real-time feedback. The one or more features may include a set of key points of the posture information for each fitness activity of a plurality of fitness activities, a movement of one or more body parts for each fitness activity, a number of repetitions for each fitness activity, the duration of each fitness activity, and a breathing pattern associated with each fitness activity.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. An electronic device, comprising:
    circuitry configured to:
        receive a set of images of a set of users engaged in a first fitness activity, wherein
            the set of users comprises a first user and a second user, and
            the set of images is captured for a duration in which the set of users are engaged in the first fitness activity;
        generate an augmented-reality display that includes a set of avatars and an image of the set of users based on the set of images, wherein the set of avatars comprises a first avatar associated with the first user and a second avatar associated with the second user;
        control a display device to render the generated augmented-reality display, wherein the rendered augmented-reality display includes the set of avatars configured to perform the first fitness activity;
        determine posture information of each user of the set of users based on the set of images and the first fitness activity;
        determine real-time feedback for each user of the set of users based on application of a first neural network model on the determined posture information, wherein the determination of the real-time feedback is further based on performance of the first fitness activity by a respective user of the set of users; and
        control one of the first avatar or the second avatar to output the determined real-time feedback in the augmented-reality display.

2. The electronic device according to claim 1, wherein the circuitry is further configured to apply a second neural network on the first-set of images to determine the posture information of the first user for the duration of the first fitness activity, and
    the posture information includes a plurality of key points corresponding to joints of a body of the first user.

3. The electronic device according to claim 2, wherein the circuitry is further configured to:
    receive a user input for selection of the first fitness activity from a set of fitness activities;
    determine a first set of key points from the plurality of key points based on the selection of the first fitness activity;
    apply the first neural network model on the determined first set of key points to classify the posture information of the first user; and
    determine the real-time feedback based on the classification.

4. The electronic device according to claim 3, wherein the circuitry is further configured to:
    determine a set of coordinate values associated with the determined first set of key points;
    determine one or more angles between lines connecting the set of coordinate values;
    compare the determined one or more angles with a reference posture, wherein the reference posture includes a set of reference angles between the first set of key points;
    generate a classification result based on the comparison; and
    determine the real-time feedback based on the classification result.

5. The electronic device according to claim 2, wherein the circuitry is further configured to:
    receive a user input for selection of a second fitness activity from a set of fitness activities;
    determine a second set of key points from the plurality of key points based on the selection of the second fitness activity;
    apply the first neural network model on the second set of key points to classify the posture information of the first user; and
    determine the real-time feedback based on the classification.

6. The electronic device according to claim 1, wherein the circuitry is further configured to:
    control an image sensor to capture the set of images;
    determine a position of the first user in the augmented reality display based on the captured set of images;
    control the display device to render the first avatar in the augmented-reality display based on the determined position; and
    detect a specific gesture of the first user based on the first set of images to trigger the rendered first avatar to start the first fitness activity.

7. The electronic device according to claim 1, wherein the circuitry is further configured to output the determined real-time feedback as one of a movement of one of the first avatar or the second avatar in the augmented-reality display, a synthesized speech, or a textual feedback.

8. The electronic device according to claim 1, wherein the determined real-time feedback is associated with at least one of a movement of one or more parts of a body of the first user, a posture of the first user, a number of repetitions of the first fitness activity, the duration of the first fitness activity, or a breathing pattern of the first user during the first fitness activity.

9. The electronic device according to claim 8, wherein
    the determined real-time feedback further comprises a motivational phrase based on the performance of the first user; and
    the circuitry is further configured to output the motivational phrase as a synthesized speech or a textual feedback.

10. The electronic device according to claim 1, wherein the circuitry is further configured to:

receive a user input associated with at least one of a set of body parameters of the first user, a user profile of the first user, a fitness goal of the first user, a medical condition of the first user, or an experience level of the first user in performing the first fitness activity;

acquire a performance history of the first user associated with one or more previous fitness activities of the first user;

generate a fitness routine that includes a suggestion of one or more potential fitness activities based on at least one of the received user input or the performance history, wherein the one or more potential fitness activities includes the first fitness activity; and output the fitness routine on one of the display device or a user device associated with the first user.

11. The electronic device according to claim 10, wherein the circuitry is further configured to:

determine, based on the fitness routine, an activity schedule for performing the first fitness activity by the first user; and output one or more notifications periodically to the user device based on the determined activity schedule, wherein the notifications include one of a reminder to perform the first fitness activity or a status of the first fitness activity with respect to the fitness goal.

12. The electronic device according to claim 10, wherein the circuitry is further configured to generate the first avatar based on the set of body parameters of the first user and the user profile of the first user.

13. The electronic device according to claim 1, wherein the circuitry is further configured to:

receive sensor data associated with biological information of a body of the first user, and determine the real-time feedback based on the received sensor data.

14. The electronic device according to claim 1, wherein the circuitry is further configured to train the first neural network model on one or more features to classify the posture information of the first user and to determine the real-time feedback, and the one or more features comprise a set of key points of the posture information for each fitness activity of a plurality of fitness activities, a movement of one or more body parts for each fitness activity, a number of repetitions for each fitness activity, the duration of each fitness activity, and a breathing pattern associated with each fitness activity.

15. A method, comprising:

receiving a set of images of a set of users engaged in a fitness activity, wherein
the set of users comprises a first user and a second user, and
the set of images is captured for a duration in which the set of users are engaged in the fitness activity;

generating an augmented-reality display that includes a set of avatars and an image of the set of users based on the set of images, wherein the set of avatars comprises a first avatar associated with the first user and a second avatar associated with the second user;

controlling a display device to render the generated augmented-reality display, wherein the rendered augmented-reality display includes the set of avatars configured to perform the fitness activity;

determining posture information of each user of the set of users based on the set of images and the fitness activity;

determining real-time feedback for each user of the set of users based on application of a first neural network model on the determined posture information, wherein the determination of the real-time feedback is further based on performance of the fitness activity by a respective user of the set of users; and controlling one of the first avatar or the second avatar to output the determined real-time feedback in the augmented-reality display.

16. The method according to claim 15, further comprising applying a second neural network on the set of images to determine the posture information of the first user for the duration of the fitness activity, wherein the posture information includes a plurality of key points corresponding to joints of a body of the first user.

17. The method according to claim 15, wherein the determined real-time feedback is associated with at least one of a movement of one or more parts of a body of the first user, a posture of the first user, a number of repetitions of the fitness activity, the duration of the fitness activity, or a breathing pattern of the first user during the fitness activity.

18. A non-transitory computer-readable medium having stored thereon, computer-executable instructions that when executed by a processor of an electronic device, causes the processor to execute operations, the operations comprising:

receiving a set of images of a set of users engaged in a fitness activity, wherein
the set of users comprises a first user and a second user, and
the set of images is captured for a duration in which the set of users are engaged in the fitness activity;

generating an augmented-reality display that includes a set of avatars and an image of the set of users based on the set of images, wherein the set of avatars comprises a first avatar associated with the first user and a second avatar associated with the second user;

controlling a display device to render the generated augmented-reality display, wherein the rendered augmented-reality display includes the set of avatars configured to perform the fitness activity;

determining posture information of each user of the set of users based on the set of images and the fitness activity;

determining real-time feedback for each user of the set of users based on application of a first neural network model on the determined posture information, wherein the determination of the real-time feedback is further based on performance of the fitness activity by a respective user of the set of users; and controlling one of the first avatar or the second avatar to output the determined real-time feedback in the augmented-reality display.

19. An electronic device, comprising:

circuitry configured to:

train a first neural network model on one or more features to classify posture information and to determine a real-time feedback, wherein the one or more features comprise a set of key points of the posture information for each fitness activity of a plurality of fitness activities, a movement of one or more body parts for each fitness activity, a number of repetitions for each fitness activity, a duration of each fitness activity, and a breathing pattern associated with each fitness activity;

receive a set of images of a user, wherein the set of images is captured for the duration in which the user is engaged in a fitness activity of the plurality of fitness activities;

generate an augmented-reality display that includes an avatar and an image of the user based on the set of images;
control a display device to render the augmented-reality display, wherein the rendered augmented-reality display includes the avatar configured to perform the fitness activity;
determine the posture information of the user based on the set of images for the duration in which the user is engaged in the fitness activity;
determine the real-time feedback based on application of the first neural network model on the determined posture information, wherein the determination of the real-time feedback is further based on performance of the fitness activity by the user; and
control the avatar to output the determined real-time feedback in the augmented-reality display.

* * * * *